United States Patent
Lim et al.

(10) Patent No.: US 12,167,026 B2
(45) Date of Patent: Dec. 10, 2024

(54) METHOD FOR ENCODING AND DECODING VIDEO, AND APPARATUS USING SAME

(71) Applicant: LG ELECTRONICS INC., Seoul (KR)

(72) Inventors: Jaehyun Lim, Seoul (KR); Jungsun Kim, Seoul (KR); Seungwook Park, Seoul (KR); Jaewon Sung, Seoul (KR); Byeongmoon Jeon, Seoul (KR); Joonyoung Park, Seoul (KR); Yongjoon Jeon, Seoul (KR); Younghee Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/130,105

(22) Filed: Apr. 3, 2023

(65) Prior Publication Data
US 2023/0239493 A1 Jul. 27, 2023

Related U.S. Application Data

(63) Continuation of application No. 17/563,743, filed on Dec. 28, 2021, now Pat. No. 11,653,021, which is a
(Continued)

(51) Int. Cl.
*G06V 10/00* (2022.01)
*G06T 9/00* (2006.01)
(Continued)

(52) U.S. Cl.
CPC ............. *H04N 19/52* (2014.11); *G06T 9/004* (2013.01); *H04N 19/159* (2014.11);
(Continued)

(58) Field of Classification Search
CPC .... H04N 19/52; H04N 19/159; H04N 19/103; H04N 19/50; H04N 19/176;
(Continued)

(56) References Cited

U.S. PATENT DOCUMENTS 9,124,899 B2 * 9/2015 Misra .................... H04N 19/59
9,165,379 B2 * 10/2015 Lim ..................... H04N 19/176
(Continued)

*Primary Examiner* — Amir Alavi
(74) *Attorney, Agent, or Firm* — Bryan Cave Leighton Paisner LLP

(57) ABSTRACT

The present invention relates to a technique for encoding and decoding video data, and more particularly, to a method for performing inter-prediction in an effective manner. The present invention combines an inter-prediction method using an AMVP mode and an inter-prediction method using a merge mode so as to propose a method for using the same candidate. The method for encoding video data proposed by the present invention comprises the following steps: receiving mode information on an inter-prediction method of a current block; determining, on the basis of the received mode information, whether the interprediction method to be applied to the current block is an AMVP mode or a merge mode; and selecting a candidate to derive motion information of the current block, wherein the candidate is selected in a left region, top region and corner region of the current block and in the same position block as the current block, and the AMVP mode and the merge mode are applied on the basis of the selected candidate.

3 Claims, 20 Drawing Sheets

Related U.S. Application Data continuation of application No. 16/855,861, filed on Apr. 22, 2020, now Pat. No. 11,245,918, which is a continuation of application No. 16/123,648, filed on Sep. 6, 2018, now Pat. No. 10,666,969, which is a continuation of application No. 15/385,586, filed on Dec. 20, 2016, now Pat. No. 10,097,854, which is a continuation of application No. 14/845,883, filed on Sep. 4, 2015, now Pat. No. 9,560,374, which is a continuation of application No. 13/819,385, filed as application No. PCT/KR2011/006530 on Sep. 2, 2011, now Pat. No. 9,165,379.

(60) Provisional application No. 61/379,708, filed on Sep. 2, 2010, provisional application No. 61/410,939, filed on Nov. 8, 2010, provisional application No. 61/412,805, filed on Nov. 12, 2010.

(51) Int. Cl.
*H04N 19/159* (2014.01)
*H04N 19/176* (2014.01)
*H04N 19/182* (2014.01)
*H04N 19/31* (2014.01)
*H04N 19/52* (2014.01)

(52) U.S. Cl.
CPC ......... *H04N 19/176* (2014.11); *H04N 19/182* (2014.11); *H04N 19/31* (2014.11)

(58) Field of Classification Search
CPC .. H04N 19/182; H04N 19/31; H04N 7/26244; H04N 7/30; H04N 7/26335; H04N 7/26271; H04N 7/26765; H04N 7/361; H04N 7/462; H04N 7/26015; G06T 9/004; G06T 3/4038; G06T 5/50
See application file for complete search history.

(56) References Cited

U.S. PATENT DOCUMENTS

| | | | |
|---|---|---|---|
| 9,191,676 B2 * | 11/2015 | Shimada | H04N 19/593 |
| 9,282,332 B2 * | 3/2016 | Koyama | H04N 19/52 |
| 9,560,374 B2 * | 1/2017 | Lim | H04N 19/31 |
| 10,097,854 B2 * | 10/2018 | Lim | H04N 19/176 |
| 10,462,479 B2 * | 10/2019 | Takano | H04N 19/52 |
| 10,666,969 B2 * | 5/2020 | Lim | H04N 19/159 |
| 10,798,403 B2 * | 10/2020 | Ikai | H04N 19/513 |
| 11,245,918 B2 * | 2/2022 | Lim | H04N 19/159 |
| 11,653,021 B2 * | 5/2023 | Lim | H04N 19/52 382/238 |
| 2013/0114722 A1 * | 5/2013 | Koyama | H04N 19/16 375/E7.125 |

\* cited by examiner

METHOD FOR ENCODING AND DECODING VIDEO, AND APPARATUS USING SAME

This application is a continuation application of U.S. patent application Ser. No. 17/563,743, filed Dec. 28, 2021, which is a continuation application of U.S. patent application Ser. No. 16/855,861, filed Apr. 22, 2020, now U.S. Pat. No. 11,245,918, which is a continuation application of U.S. patent application Ser. No. 16/123,648 filed Sep. 6, 2018, now U.S. Pat. No. 10,666,969, which is a continuation application of U.S. patent application Ser. No. 15/385,586 filed Dec. 20, 2016, now U.S. Pat. No. 10,097,854, which is a continuation application of U.S. patent application Ser. No. 14/845,883 filed Sep. 4, 2015, now U.S. Pat. No. 9,560,374, which is a continuation application of U.S. patent application Ser. No. 13/819,385 filed Feb. 27, 2013 now U.S. Pat. No. 9,165,379 which is a National Stage Application of International Application No. PCT/KR2011/006530 filed Sep. 2, 2011, and claims priority to and benefit of U.S. Provisional Application No. 61/379,708 filed Sep. 2, 2010, U.S. Provisional Application No. 61/410,939 filed Nov. 8, 2010 and U.S. Provisional Application No. 61/412,805 filed Nov. 12, 2010, all of which are hereby incorporated by reference for all purposes as if fully set forth herein.

TECHNICAL FIELD

The present invention relates to an image compression technique, and more particularly, to an inter prediction method and device.

BACKGROUND ART

Recently, demands for high resolution and high quality images have been increased in a variety of application fields. However, as images have a higher resolution and higher quality, the amount of information on the corresponding images is further increased. Accordingly, if image information is transmitted using media such as typical wired and wireless broadband lines or image information is stored using typical storage media, information transfer costs and storage costs are increased.

In order to effectively transmit, store, or play information on high resolution and high quality images, a highly-efficient image compression technique may be used.

In order to improve the efficiency of image compression, inter prediction and intra prediction may be used. Pixel values of a current picture are predicted with reference to information on another picture in inter prediction method, and pixel values by using a relationship between pixels in the same picture in intra prediction method.

DISCLOSURE

Technical Problem

The present invention provides a prediction method to increase the efficiency of image compression.

The present invention also provides a method to effectively provide inter prediction.

The present invention also provides a method to increase the compression efficiency of image information and maintaining image quality simultaneously.

The present invention also provides a method to reduce the amount of information processed during image information encoding/decoding.

The present invention also provides a method to reduce the complexity of image information encoding/decoding.

Technical Solution

In an aspect, a method of encoding image information includes determining a prediction mode of a current block, and when the determined prediction mode is a skip mode, transmitting information that specifies one prediction direction among a forward direction, a backward direction, or a bi-direction.

In another aspect, a method of decoding image information includes determining a prediction mode of a current block, and when the prediction mode of the current block is a skip mode, according to information that indicates a prediction direction, setting the prediction direction of the skip mode as a uni-direction or a bi-direction.

In another aspect, a method of encoding image information includes checking costs for using each candidate with respect to AMVP candidates, comparing the sameness between a merge candidates and the AMVP candidates, checking costs for a merge candidate which is different from the AMVP candidate, and based on the checked costs, determining an inter prediction mode that is to be applied to a current block.

In another aspect, a method of decoding image information includes selecting AMVP candidates from neighboring area of a current block, determining the sameness between the AMVP candidates and merge candidates, and based on the sameness determination result, merging the current block into a merge candidate which may be different from the AMVP candidates.

In another aspect, a method of encoding image information includes selecting AMVP candidates from neighboring area of a current block and configuring an AMVP candidate list, determining whether there is a merge candidate not included in the AMVP candidate list, and when there is a merge candidate not included in the AMVP candidate list, performing a signaling operation to add the merge candidate to the AMVP candidate list or change a predetermined candidate among the candidates of the AMVP candidate list into the merge candidate.

In another aspect, a method of decoding image information includes selecting AMVP candidates from neighboring area of a current block and configuring an AMVP candidate list, if there is a merge candidate not included in the AMVP candidate list, adding the merge candidate to the AMVP candidate list or changing a predetermined candidate among the candidates of the AMVP candidate list into the merge candidate, and predicting with respect to a current block on the basis of the changed AMVP candidate list.

In another aspect, a method of encoding image information includes determining a prediction method applied to a current block among an inter prediction method using an AMVP and an inter prediction method using a merge mode, and transmitting information on the determined prediction method. Here, candidates of the AMVP and candidates of the merge mode may be integrated and used.

In another aspect, a method of decoding image information includes receiving mode information on an inter prediction method of a current block, and selecting candidates for deriving motion information on the current block. Here, the candidates may be selected from the left area, top area, and corner area of the current block and a co-located block with respect to the current block. Moreover, the candidates, as blocks specifically positioned in the left area, top area, and corner area of the current block, may be blocks of an inter prediction mode. In addition, the candidates may be the bottom block at the left area of the current block, the rightmost block at the top area of the current block, and the left below corner block, left top corner block, and right top corner block with respect to the current block.

Advantageous Effects

According to the present invention, the compression efficiency of image information is increased and image quality is maintained simultaneously.

According to the present invention, the amount of information processed during image information encoding/decoding is reduced and the efficiency of image information processing is improved.

According to the present invention, the complexity of image information encoding/decoding is reduced and the efficiency of image information processing is improved.

MODE FOR INVENTION

Figure 1:
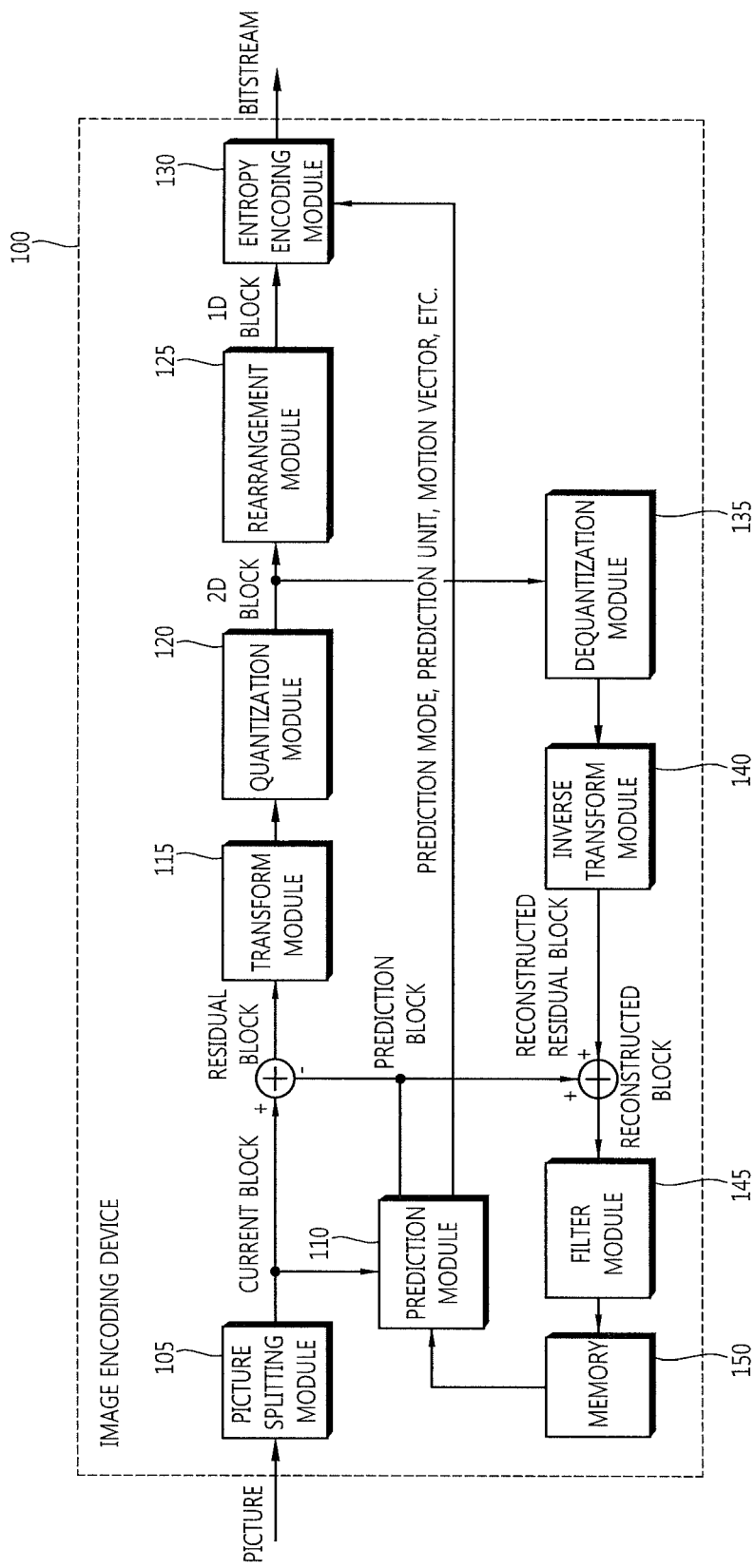
FIG. 1 is a block diagram illustrating an image encoding device according to an embodiment of the present invention.

The present invention may be embodied with many different modifications and thus may include several embodiments. Therefore, specific embodiments will be shown in the drawings and described in detail. However, this does not intend to limit the specific embodiments of the present invention. The terms herein are used only for explaining the specific embodiments of the present invention while not limiting the technical idea of the present invention. A singular form used for the terms herein may include a plural form unless being clearly different from the context. In this specification, the meaning of "include," "comprise," "including," or "comprising," specifies a property, a region, a fixed number, a step, a process, an element and/or a component but does not exclude other properties, regions, fixed numbers, steps, processes, elements and/or components.

Each component on the drawings described herein is separately provided for convenience of description on different feature functions in an image encoding/decoding device, and is not limited to being implemented with separate hardware or software. For example, at least two components may be combined to constitute one component, or one component may be split into several components. Embodiments including integrated and/or separated components are included in the scope of the present invention without departing from the sprit of the present invention.

Hereinafter, with reference to the accompanying drawings, preferred embodiments of the present invention will be described in more detail. Hereinafter, like reference numerals refer to like elements throughout, and their overlapping descriptions will be omitted.

FIG. 1 is a block diagram illustrating an image encoding device according to an embodiment of the present invention. Referring to FIG. 1, the image encoding device 100 includes a picture splitting module 105, a prediction module 110, a transform module 115, a quantization module 120, a rearrangement module 125, an entropy encoding module 130, an inverse quantization module 135, an inverse transform module 140, a filter module 145, and a memory 150.

The picture splitting module 105 may split an inputted picture by at least one processing unit. At this point, the processing unit may be a Prediction Unit (PU), a Transform Unit (TU), or a Coding Unit (CU).

The prediction module 110, as described later, includes an inter prediction module for performing inter prediction and an intra prediction module for performing intra prediction. The prediction module 110 performs prediction on the processing unit of a picture split in the picture splitting module 105 in order to generate a prediction block. The processing unit of a picture in the prediction module 110 may be CU, TU, or PU. Additionally, after determination is made on whether prediction performed on a corresponding processing unit is inter prediction or intra prediction, the specific details of each prediction method (for example, a prediction mode) may be determined. At this point, the processing unit for performing prediction may be different from that for determining a prediction method and specific details. For example, a prediction method and a prediction mode may be determined by PU and prediction may be performed by TU.

A residual (for example, a residual block or a residual signal) between a generated prediction block and an original block is inputted to the transform module 115. Additionally, prediction mode information and motion vector information used for prediction are encoded together with the residual in the entropy encoding module 130, and then delivered to a decoder.

The transform module 115 performs transformation on a residual block by TU and generates transform coefficients. The transform module 115 may use TU for transformation and TU may have a quad tree structure. At this point, the size of TU may be determined within a range of a predetermined maximum and minimum size. The transform module 115 may transform a residual block through Discrete Cosine Transform (DCT) and/or Discrete Sine Transform (DST).

The quantization module 120 may generate quantization coefficients by quantizing the residuals transformed by the transform module 115. The value obtained by the quantization module 120 is provided to the dequantization module 135 and the rearrangement module 125.

The rearrangement module 125 rearranges the provided quantization coefficients from the quantization module 120. By rearranging the quantization coefficients, the encoding efficiency in the entropy encoding module 130 may be improved. The rearrangement module 125 may rearrange the quantization coefficients of a two dimensional block form in a one dimensional vector form through a coefficient scanning method. The rearrangement module 125 may change the order of coefficient scanning on the basis of stochastic statistics for the delivered coefficients from the quantization module 120, thereby improving the entropy encoding efficiency in the entropy encoding module 130.

The entropy encoding module 130 may perform entropy encoding on the quantization coefficients rearranged by the rearrangement module 125. The entropy encoding may use an encoding method such as Exponential Golomb, Context-Adaptive Variable Length Coding (CAVLC), and Context-Adaptive Binary Arithmetic Coding (CABAC). The entropy encoding module 130 may encode various information such as quantization coefficient information and block type information, prediction mode information, partition unit information, prediction unit information and transmission unit information, motion vector information, reference picture information, interpolation information of a block, and filtering information, delivered from the rearrangement module 125 and the prediction module 110.

The dequantization unit 135 dequantizes the values quantized by the quantization module 120, and the inverse transform module 140 inverse-transforms the value dequantized by the dequantization module 135. The residual generated by the dequantization module 135 and the inverse transform module 140 may be combined with the prediction block predicted by the prediction module 110 in order to generate a reconstructed block.

The filter module 145 may apply a deblocking filter and/or an Adaptive Loop Filter (ALF) to a reconstructed picture.

The deblocking filter may remove block distortion occurring at the boundary between blocks in the reconstructed picture. The ALF may perform filtering on the basis of a value obtained by comparing a reconstructed image with an original image after a block is filtered through the deblocking filter. The ALF may be used only when high efficiency is applied.

Moreover, the filter module 145 may not apply filtering on a reconstructed block used for inter prediction The memory 150 may store the reconstructed block or picture calculated by the filter module 145. The reconstructed block or picture stored in the memory 150 may be provided to the prediction module 110 for performing inter prediction.

The CU is a unit by which encoding/decoding of a picture is performed, has a depth on the basis of a quad tree structure, and can be split. The CU may have several sizes such as 64×64, 32×32, 16×16, and 8×8.

An encoder may transmit information on a Largest Coding Unit (LCU) and a Smallest Coding Unit (SCU) to a decoder. Besides the information on an LCU and a SCU, information on the number of available divisions (i.e. depth information) may be transmitted to a decoder. Information on whether the CU is split on the basis of a quad tree structure may be transmitted from an encoder to a decoder through flag information such as a split flag. Hereinafter, unless otherwise described, "transmission" in this specification means information delivery from an encoder to a decoder.

Figure 2:
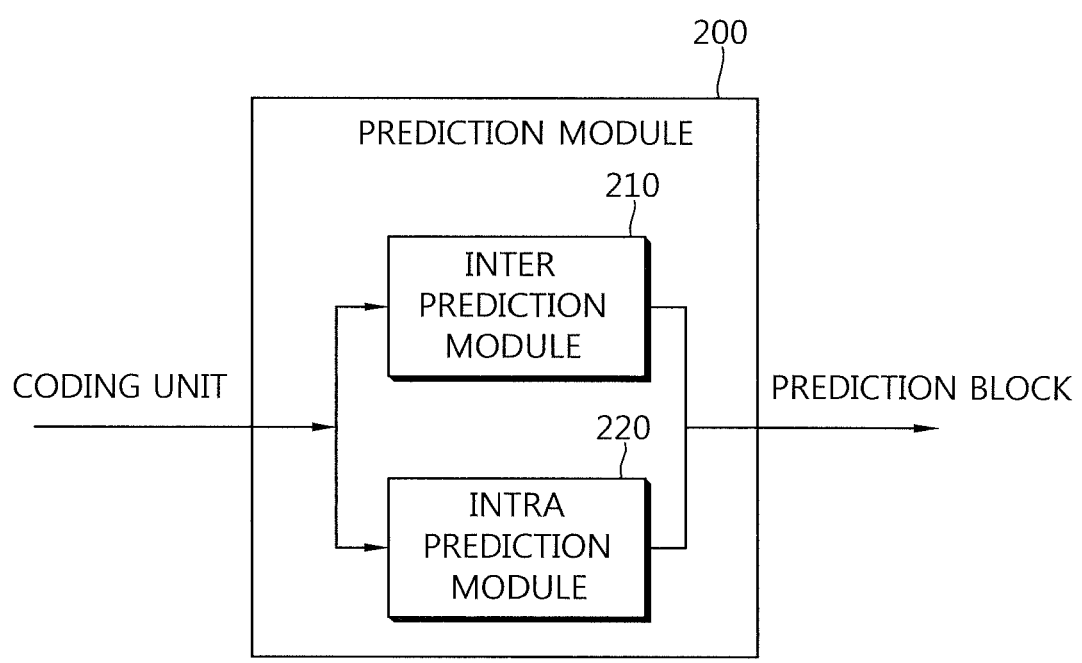
FIG. 2 is a conceptual diagram illustrating a prediction unit according to an embodiment of the present invention.

FIG. 2 is a conceptual diagram illustrating a prediction module according to an embodiment of the present invention.

Referring to FIG. 2, the prediction module 200 may include an inter prediction module 210 and an intra prediction module 220.

The inter prediction module 210 may perform prediction on the basis of information on at least one picture among previous pictures and/or following pictures of a current picture in order to generate a prediction block. Additionally, the intra prediction module 220 may perform prediction on the basis of pixel information on a current picture in order to generate a prediction block. The inter prediction module 210 may select a reference picture for a prediction unit, and may select a reference block which may have the same size as a prediction unit, as an integer pixel sample unit. Then, the inter prediction module 210 generates a prediction block in which a residual signal with respect to a current prediction unit is minimized and the size or magnitude of a motion vector is also minimized. The prediction block may be generated by a sample unit of less than an integer such as a ½ pixel sample unit and a ¼ pixel sample unit.

At this point, a motion vector may be expressed with a unit of less than an integer pixel, and for example, may be expressed with a ¼ pixel unit with respect to a luma pixel and expressed with a ⅛ pixel unit with respect to a chroma pixel.

Information on the index of a reference picture, a motion vector (for example, a motion vector predictor), and a residual signal which are selected by the inter prediction module 210 is encoded and delivered to a decoder.

Figure 3:
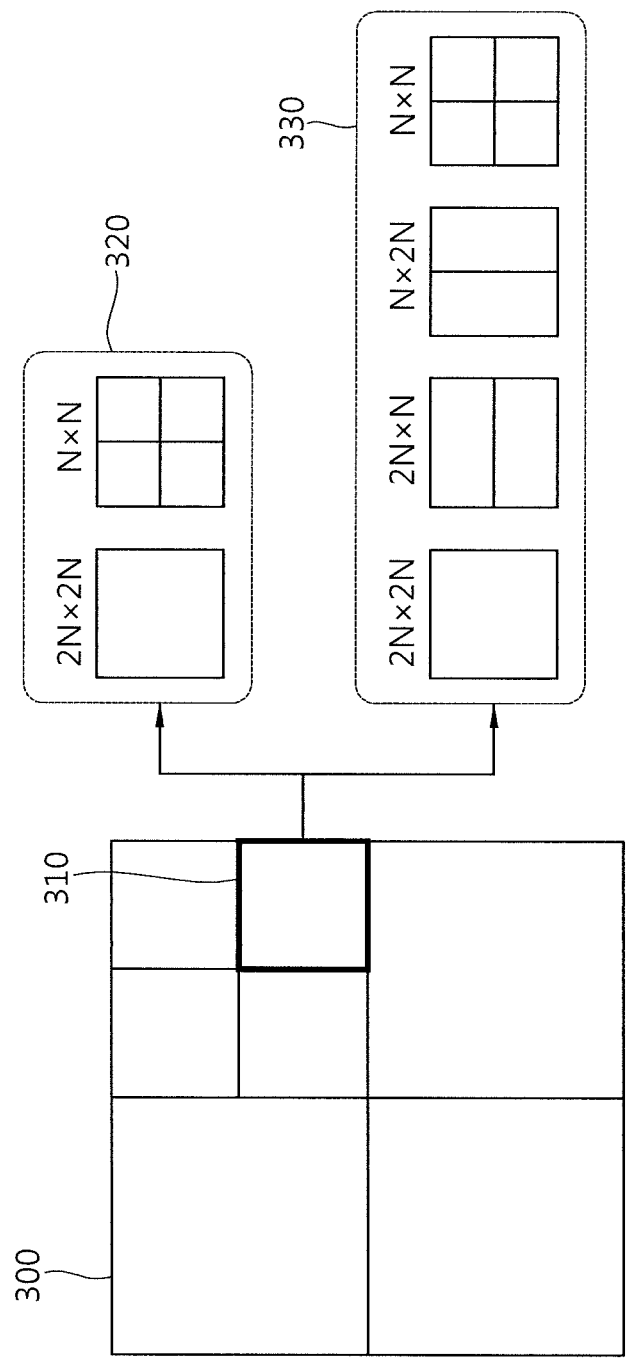
FIG. 3 is a view illustrating a quad tree structure of a processing unit in a system according to an embodiment of the present invention.

FIG. 3 is a view illustrating a quad tree structure of a processing unit in a system according to an embodiment of the present invention.

An LCU 300 may have a hierarchical structure consisting of smaller encoding units 310 through splits and the size of a hierarchical structure of a coding unit may be specified based on size information, depth information, and split flag information, etc. The size information on an LCU, split depth information, and information on whether a current encoding unit is split may be included a Sequence Parameter Set (SPS) on bitstream and is transmitted to an image decoding unit. However, since an SCU is no longer split into a smaller coding unit, a split flag of an encoding unit with respect to an SCU may not be transmitted.

Moreover, determination may be made on which one of an inter prediction and an intra picture prediction is performed by a CU unit. When an inter prediction is performed, an inter prediction may be performed by a PU. When an intra picture prediction is performed, a prediction mode may be determined by a PU so that prediction may be performed by a PU. At this point, a prediction mode may be determined by a PU and an intra picture prediction may be performed by a TU.

Referring to FIG. 3, in the case of an intra picture prediction, the PU 320 may have the size of 2N×2N or N×N (N is an integer) and in the case of an inter prediction, the PU 330 may have the size of 2N×2N, 2N×N, N×2N, or N×N (N is an integer). At this point, in the case of N×N, for example, it may be determined to be applied to only an specific case such as SCU or an intra picture prediction. Additionally, besides the size of a prediction block, N×mN, mN×N, 2N×mN, or mN×2N (m<1) may be further defined and used.

Figure 4:
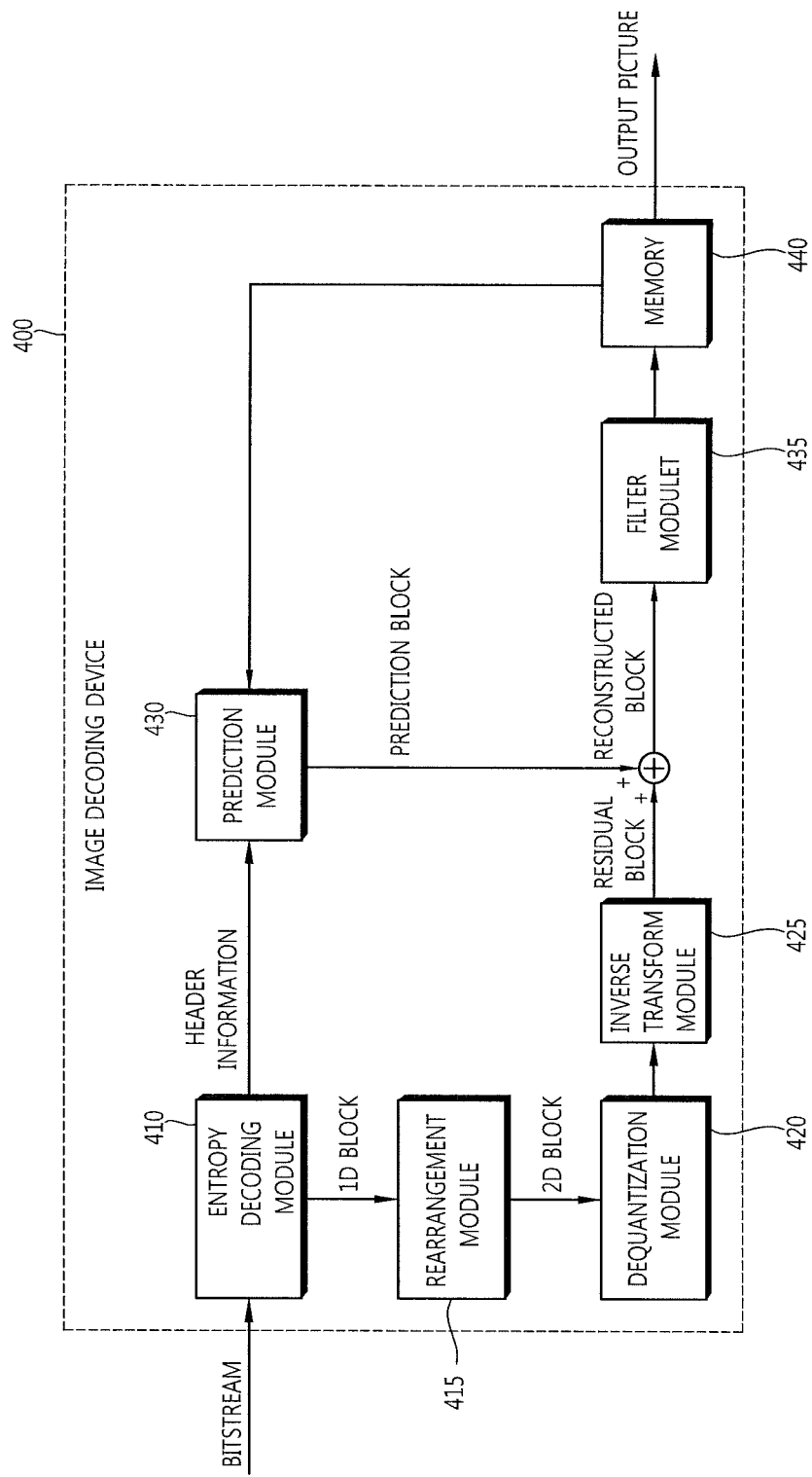
FIG. 4 is a block diagram illustrating an image decoding unit according to an embodiment of the present invention.

FIG. 4 is a block diagram illustrating an image decoding device according to an embodiment of the present invention. Referring to FIG. 4, the image decoding device 400 includes an entropy decoding module 410, a rearrangement module 415, a dequantization module 420, an inverse transform module 425, a prediction module 430, a filter module 435, and a memory 440.

When an image bitstream is inputted into an image decoding device, it may be decoded according to an image processing procedure which is applied in the image encoding device.

For example, when Variable Length Coding (VLC) such as CAVLC is used in order to perform entropy encoding in an image encoding device, the entropy decoding module 410 may perform entropy decoding with the same VLC table as that used in the image encoding device. When CABAC is used in order to perform entropy encoding in an image encoding device, the entropy decoding module 410 may perform entropy decoding through the CABAC in correspondence thereto.

The entropy decoding module 410 entropy-decodes information in the transmitted entropy-encoded bitstream. Information for generating a prediction block among information decoded in the entropy decoding module 410 may be provided to the prediction module 430, and residuals obtained through entropy decoding in the entropy decoding module 410 may be inputted to the rearrangement module 415.

The rearrangement module 415 may rearrange the bitstream entropy-decoded by the entropy decoding module 410 based on a rearrangement method of an image encoding device. The rearrangement module 415 may rearrange coefficients in a one directional vector form into those in a second dimensional block form. The rearrangement module 315 performs arrangement through a method that receives information relating to the coefficient scanning performed by an encoder and performs inverse scanning on the basis of the scanning order performed by a corresponding encoding unit.

The dequantization module 420 may perform dequantization on the basis of a quantization parameter provided from an encoder and a coefficient value of a rearranged block.

The inverse transform module 425 may perform inverse DCT and/or inverse DST with respect to DCT and DST that a transform unit of an encoder performs, on a quantization result of an image encoding device. Inverse transformation may be performed by a transmission unit or an image split unit determined by an encoder. DCT and/or DST in a transform module of an encoder may be selectively performed according to info nation on the size or prediction direction of a current block, and the inverse transform module 425 of a decoder may perform inverse transformation on the basis of the transform information from a transform module of an encoder.

The prediction module 430 may generate a prediction block on the basis of the prediction block generation related information provided from the entropy decoding module 410 and the previously decoded block and/or picture information provided from the memory 440. A reconstructed block may be generated by using a prediction block generated by the prediction module 430 and a residual block provided from the inverse transform module 425.

The reconstructed block and/or picture may be provided to the filter module 435. The filter module 435 applies deblocking filtering, Sample Adaptive Offset (SAO), and/or adaptive loop filtering on the reconstructed block and/or picture.

The memory 440 may store the reconstructed picture or block in order to use it as a reference picture or a reference block, or may provide the reconstructed picture to an output unit.

Figure 5:
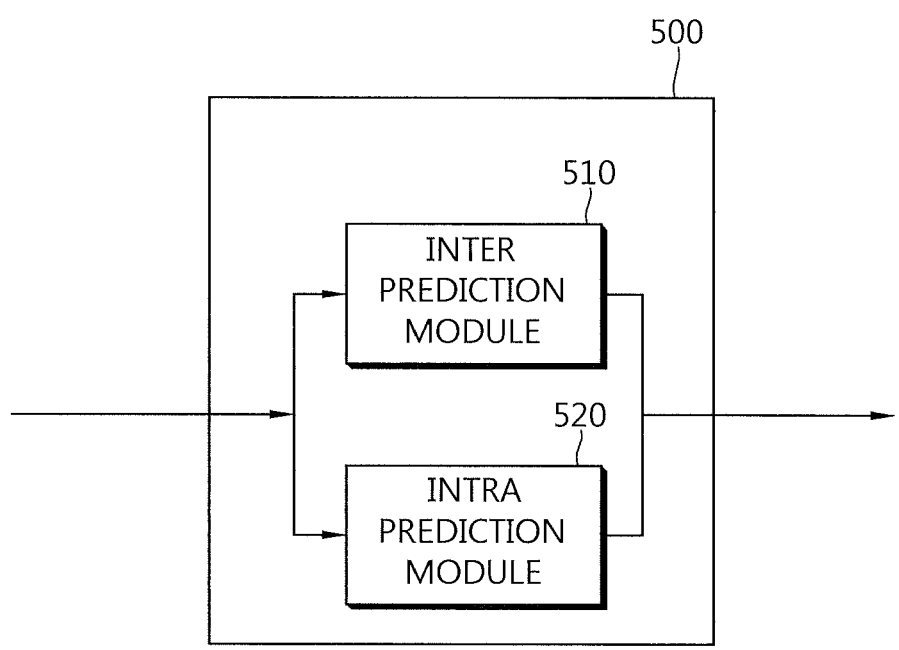
FIG. 5 is a conceptual diagram illustrating a prediction unit of an image decoding device according to an embodiment of the present invention.

FIG. 5 is a conceptual diagram illustrating a prediction module of an image decoding device according to an embodiment of the present invention.

Referring to FIG. 5, the prediction module 500 may include an intra picture prediction module 510 and an inter prediction module 510.

When a prediction mode for a corresponding prediction unit is an intra prediction mode (i.e., an intra picture prediction mode), the intra picture prediction module 510 may generate a prediction block on the basis of pixel information in a current picture.

When a prediction mode for a corresponding prediction unit is an inter prediction mode (i.e., an inter prediction mode), the inter prediction module 520 performs an inter prediction on a current prediction unit by using motion information necessary for inter prediction of a current prediction unit provided from an image encoding device, for example, information on a motion vector and a reference picture index, etc., on the basis of information in at least one picture among previous pictures or following pictures of a current picture including a current prediction unit. At this point, after the skip flag and the merge flag of a received encoding unit are confirmed, motion information may be derived according thereto.

Although the case that the prediction module 500 includes each function component is described, for convenience of description, the present invention is not limited thereto. That is, the prediction module 500 may include a single component for performing the above functions.

In the case of an inter prediction mode, a method of deriving motion information in an encoding device and a decoding device includes a skip mode, a direct mode, and a merge mode, etc.

The skip mode and the direct mode use motion information derived from candidate Motion Vector Predictors (MVPs) in an Advanced Motion Vector Predictor (AMVP). For convenience of description, the skip mode and the direct mode together are referred to as an AMVP mode. For example, in the AMVP mode, a motion vector of a current block with respect to a reference picture may be derived using the sum of a Motion Vector Difference (MVD) of a current block and a neighbor block with respect to the reference picture and a Motion Vector Predictor (MVP) of a neighboring block with respect to the reference picture.

In relation to a block having the direct mode applied, a residual block corresponding to a difference value of a prediction block, generated based on a reference block that the motion vector of the block of the direct mode indicates, and a current block may be transmitted. In relation to a block having the skip mode applied (for example, a prediction unit), a residual signal may not be transmitted from an encoder to decoder. In the case of the skip mode, a value of a prediction block may be used as a value of a current block.

In the case of the merge mode applied, a merge candidate among neighbor blocks of a current block (i.e., a prediction target block) may be determined and motion information on one of merge candidates may be used as motion information of a current block. A residual signal with respect to a current block having a merge mode applied may be transmitted.

Figure 6:
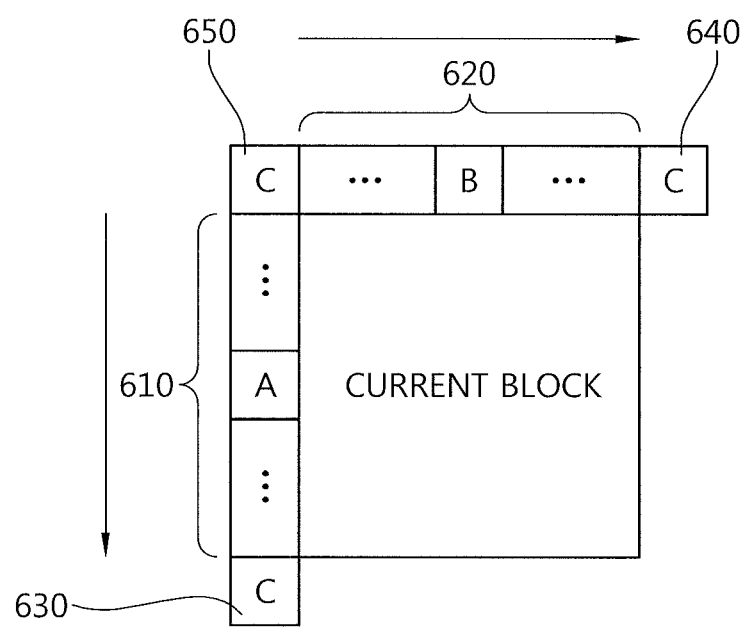
FIG. 6 is a view illustrating an AMVP mode in a system according to an embodiment of the present invention.

FIG. 6 is a view illustrating an AMVP mode in a system according to an embodiment of the present invention.

When an AMVP is applied, the best MVP may be selected by applying Motion Vector Competition (MVC) on MVPs of an available candidate blocks around a current block and/or an available block among partitions of each reference picture which are co-located with a current block. Here, the available block among partitions of each reference picture which are co-located with a current block may be referred to as a co-located block and the reference picture may be referred to as a target picture. A motion vector of a current block may be derived based on the best MVP. Moreover, when a neighbor block of a current block is an inter prediction mode, it may not be an available block.

Referring to embodiment of FIG. 6, while searching is made in the arrow direction at the left area 610 of a current block, an MVP of the first block A may be selected as one of an AMVP candidate. Here, the first block is the block that is found at first as a block being available and having identical reference index indicating reference picture with the current picture.

Although the case that searching is made from the top to the bottom along the arrow direction in FIG. 6 is described, which is one example of a method of selecting an AMVP candidate at the left area of the current block, searching may be made from the bottom to the top unlike FIG. 6.

Additionally, instead of searching the entire left area of the current block in order, a specific block at the left area may be steadily used as an AMVP candidate. For example, the MVP of the bottom block at the left area which meets the corner block C 630 may be used as the AMVP candidate of the left area.

An AMVP candidate may be selected from the top of the current block. Referring to embodiment of FIG. 6, during search in the arrow direction at the top area 620 of the current block, an MVP of the first block B having the same reference index as the current block and available may be selected as an AMVP candidate for the top area.

Although the case that searching is made from the left to the right of the current block is described, which is one example of a method of selecting an AMVP candidate at the top area of the current block, searching may be made from the right to the left unlike FIG. 6.

Additionally, instead of searching the entire top area of the current block in order, a specific block may be steadily used as an AMVP candidate with respect to the top area of the current block. For example, the MVP of the right block at the top area which meets the corner block C 640 may be used as the AMVP candidate for the top area of the current block.

An AMVP candidate may be selected from the corner blocks 630, 640, and 650 of the current block. Referring to FIG. 6, while searching is made in the order of the top right corner block 640→the top left corner block 650→the bottom left corner block 630, the MVP of the first block having the same reference index as the current block and available may be selected with respect to the corner blocks Cs.

Although searching of the corner block in the order of the top right→the top left→the bottom left is described with reference to FIG. 6, which is one example of a method of selecting an AMVP candidate from corner blocks, unlike FIG. 6, searching may be made in the order of the bottom left→the top left→the top right, or in the order of the top left→the top right→the bottom left or the top left→the bottom left→the top right.

Additionally, instead of searching each corner block in order, all MVPs in each corner block may be selected as an AMVP candidate.

Besides the AMVP candidates for each area (the left/top/corner area of the current block) described above, a combination of the AMVP candidates for each area may be selected as one of the AMVP candidates. For example, a median value of each motion information on the MVPs selected from the left area, top area, and corner area of the current block may be taken as one of AMVP candidates.

Besides a method of selecting an AMVP candidate from blocks spatially adjacent to the current block, an MVP of a co-located block may be selected as an AMVP candidate.

The best MVP is selected through MVC with the selected AMVP candidates, and motion information on a current block may be represented based on the selected optical MVP.

For example, when AMVP candidates are selected by a prediction unit of an encoding device/decoding device, redundant MVPs may be excluded in order to reduce redundancy, and then, an AMVP candidate list may be created. In other words, after leaving only one MVP among redundant n MVPs, the remaining n−1 MVP may be excluded from the AMVP candidate list.

The number and order of MVPs constituting the AMVP candidate list may be specified. For example, after selecting a predetermined number of candidates from candidates around a current block and selecting one candidate from the co-located blocks, an AMVP candidate list may be created. At this point, an order to determine availability of candidates constituting an AMVP candidate list may be specified, and then, candidates determined to be available first according to the order may constitute a list. When a candidate block is in an intra picture prediction mode, it is regarded as an unavailable MVP and is excluded from AMVP candidates.

The prediction module may calculate costs for candidates in the AMVP candidate list in order to select the best MVP. In this case, by comparing the cost for the selected MVP from the AMVP candidate list with that for an MVP at a specific position or an MVP obtained through a specific calculation result, only one MVP may be determined.

As described above, when the best MVP is derived through the AMVP, the skip mode or the direct mode may be applicable using the best MVP.

Figure 7:
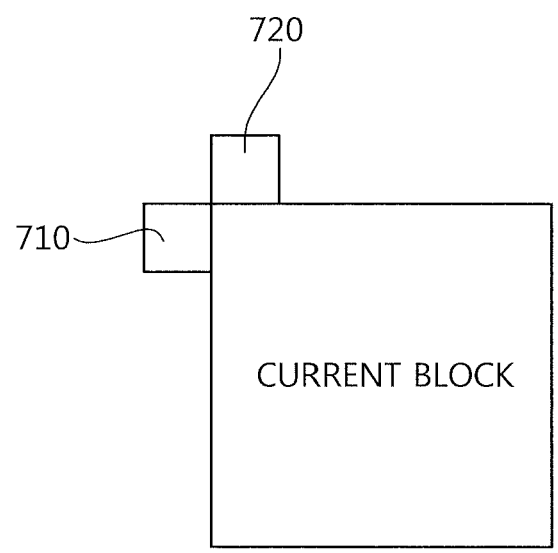
FIG. 7 is a view when a merge mode is applied in a system according to an embodiment of the present invention.

FIG. 7 is a view when a merge mode is applied in a system according to an embodiment of the present invention.

When the merge mode is applied, motion information on a current block may be represented using one motion information on blocks around the current block. For example, a motion vector for one reference block (picture) among blocks around the current block may be used as that of the current block. At this point, a residual signal may be transmitted together with motion information, and when the pixel value of a prediction block is used as that of the current block, a residual signal may not be transmitted. Here, the blocks around the current block include co-located block.

For example, as shown in embodiment of FIG. 7, the block 710 selected at the left area of the current block and the block 720 selected at the top area of the current block may be used as merge candidates. At this point, as shown in FIG. 7, the block selected at the left area of the current block may be a block at the left top and the block selected at the top area of the current block may be a block at the top left.

Additionally, when the merge mode is applied, in a way similar to the AMVP mode, a co-located block may be used as one of candidates and blocks at the corner of the current block may be used as candidates.

In this way, merge candidates may be selected and one candidate may be selected from the merge candidates. Then, motion information on the current block may be represented using the motion vector of the selected candidate. For example, when merge candidates are selected by a prediction module of an encoding device/decoding device, redundant candidates may be excluded in order to reduce redundancy, and then, a merge candidate list may be created.

The number and order of candidates constituting the merge candidate list may be specified. For example, a predetermined number of candidates may be selected from blocks around the current block and one candidate may be selected from the co-located blocks. At this point, an order to determine availability of candidates may be specified. Then, after determining of the availability of candidates according to the order, candidates determined to be available first may constitute a list. A block in an intra picture prediction mode may be determined as an unavailable block.

The prediction module may calculate costs for candidates in a merge candidate list in order to select the best candidate block. As mentioned above, once one candidate block is selected from the merge candidate list, the current block may be merged into the selected candidate block. When the current block is merged into the selected candidate block, motion information on the selected candidate block may be used as motion information on the current block.

Moreover, by comparing the cost for using the MVP selected by the AMVP with the cost for applying a merge mode, an encoding device may perform the inter prediction of the current block by using one of an AMVP mode and a merge mode.

<Direction Indication of Prediction Mode>

When the above-mentioned methods of deriving motion information are used for an encoding device, the encoding device may transmit information for deriving motion information of a current block to a decoding device.

The transmitted information first notifies that a skip mode is applied according to whether there is a residual signal, and when the skip mode is applied, allows prediction to be performed according thereto. Information on whether the skip mode is to be applied may be delivered through a flag for skip mode application (hereinafter, referred to as skip_flag).

When skip_flag indicates that a skip mode is not applied, it may indicate that a direct mode is applied. At this point, by designating an index for prediction mode and transmitting an index designated for a direct mode (for example, pred_mode==0), information that the direct mode is applied to a current block may be delivered.

When the merge mode is applied, an encoding device may transmit information on the merge mode to a decoding device. For example, with a flag (hereinafter, referred to as a merge_flag) indicating information on whether a merge mode is applied, whether the merge mode is to be applied to a corresponding block may be notified to a decoding device.

Table 1 illustrates a syntax structure used for transmitting information on a method of deriving motion information according to an embodiment of the present invention.

TABLE 1

```
prediction_unit( )
{
  .....
  skip_flag
  if (skip_flag==1)
     decoding with skip mode
  }
  else
  {
     pred_mode
     if (pred_mode==0)
     {
     decoding with direct mode
     }
     if (pred_mode==MODE_INTER)
     {
        merge_flag
        if (merge_flag==1)
           merge_left_flag
           decoding with merge mode
        }
     }
  }
  .....
}
```

Here, skip_flag is a flag indicating whether a skip mode is applied, and indicates that the skip mode is applied when a value of skip_flag is 1. Additionally, merge_flag is a flag indicating whether a merge mode is applied, and indicates that the merge mode is applied when a value of merge_flag is 1. However, Table 1 is one example of applying the above contents. Table 1 may also be defined to apply a skip mode when a value of skip_flag is 0 or apply a merge mode when a value of merge_flag is 0.

In Table 1, pred_mode is a syntax indicating which prediction mode is applied and pred_mode==0 is a value indicating that a direct mode is applied.

merge_left_flag is a flag indicating that a current block is merged into which side of a merge candidate. For example, when merge_left_flag==1, it indicates that a current block is merged into a merge candidate selected from the left of the current block and when merge_left_flag==0, it indicates that a current block is merged into a merge candidate selected from the top of the current block.

Although it is described above that a pred_mode indicating whether a direct mode is applied is confirmed first and then a merge_flag is confirmed, it is also possible that the merge_flag is confirmed first and then the pred_mode may be confirmed.

Additionally, unlike Table 1, when a skip mode that does not transmit a residual signal is applied or a merge mode is applied without the transmission of a residual signal, an upper level parameter set not a parameter set of a prediction unit level may notify related information in relation to whether a residual signal is transmitted.

Moreover, when a skip mode is applied, by adding a syntax indicating a prediction direction to a parameter set, a uni-direction prediction and a bi-directional prediction may be effectively performed.

For example, by applying a skip mode to a B slice decoded through an intra prediction or an inter prediction using a plurality of reference indices and a plurality of motion vectors and indicating a prediction direction, a uni-directional prediction, for example, an L0 direction prediction or an L1 direction prediction, may be effectively performed in the B slice. Here, L0 and L1, are reference picture lists. L0 is a list having an assigned index which is lower as a corresponding reference picture is closer to a current picture in a forward direction (i.e. the past direction on a time axis), and L1 is a list having an assigned index which is lower as a corresponding reference picture is closer to a current picture in a reverse direction (i.e. the future direction on a time axis). Accordingly, in the case of the B slice, as the skip mode is applied, one of three prediction directions (for example, the L0 direction, the L1 direction and the bi-direction) may be designated as a prediction direction.

When the skip mode is applied, a prediction direction indicator (for example, inter_pred_idc) indicating a prediction direction may be introduced as a syntax notifying a prediction direction.

Table 2 illustrates an example of syntax when inter_pred_idc is used.

TABLE 2

```
prediction_unit(x0, y0, currPredUnitSize){
  if (slice_type!=I)
    skip_flag
  if(skip_flag){
    if (slice_type==B)
      inter_pred_idc
    if(mv_competition_flag){
      if(inter_pred_idc!=Pred_L1 && NumMVPCand(L0)> 1)
        mvp_idx_l0
      if(inter_pred_idc!=Pred_L0 && NumMVPCand(L1)> 1)
        mvp_idx_l1
    }
  }
  else{
```

In Table 2, when the skip mode is applied (skip_flag=1), as mentioned above, inter_pred_idc may indicate one direction of three prediction directions (the L0 direction, the L1 direction and the bi-direction). For example, (1) when inter_pred_idc=0, it may indicate an L0 directional prediction, (2) when inter_pred_idc==1, it may indicate an L1 directional prediction, and (3) when inter_pred_idc==2, it may indicate a bi-directional prediction.

Figure 8:
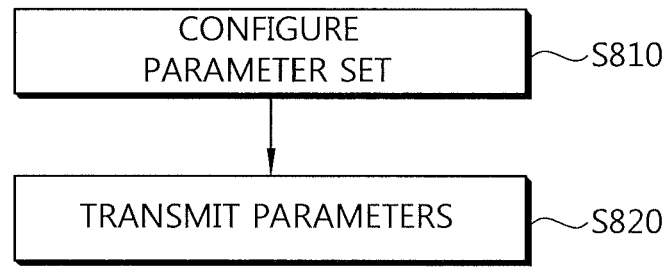
FIG. 8 is a view illustrating a method of configuring prediction mode information and transmitting it in an encoder according to an embodiment of the present invention.

FIG. 8 is a view illustrating a method of configuring prediction mode information and transmitting it in an encoding device according to an embodiment of the present invention.

Referring to FIG. 8, an encoding device may configure a parameter set first in operation S810. The parameter set is configured according to a predetermined syntax structure and includes specific information to be transmitted to a decoder. The parameter set may be referred to as a syntax for corresponding information. When a skip mode is applied, an encoding device may configure a parameter in order to include an indicator that indicates a list of reference pictures using a motion vector through the skip mode.

At this point, an encoding device may configure a parameter set in order to include an indicator that does not simply indicate a reference picture list but indicates a specific reference picture or reference block. The reference picture may be a specific picture in a reference picture list, and the reference block may be one of blocks around a current block or a co-located block.

The encoding device transmits the configured parameter set to a decoding device in operation S820. Information on the parameter set is encoded and delivered to the decoding device through bitstream.

The decoding device that receives the parameter set may obtain information for decoding the current block. The received parameter set may include information indicating a prediction direction in a skip mode. When the skip mode is applied, the decoding device may obtain motion information on a current block by using an indicated prediction direction, that is, by using an MVP with indicated reference picture list.

When the transmitted information directly indicates a reference block to which a skip mode is to be applied, the motion vector of a current block may be derived using the motion vector of a corresponding reference block. Since the skip mode is applied, a prediction block generated through the reference block that a corresponding motion vector indicates may be used as block of pixel values for a current block.

<Integration of AMVP Mode and Merge Mode—Cost Estimation and AMVP Candidate List Change>

Moreover, two derivation modes of motion information, the AMVP mode and the merge mode, are similar to each other in that pixel information on a current block is obtained through motion information derived from blocks around the current block and a residual signal (including the case that no residual signal is delivered because there is no residual). Accordingly, using a mode that AMVP mode and merge mode are integrated may be considered.

In the AMVP mode and merge mode, candidate blocks used for deriving motion information on a current block may be different. For example, in the AMVP mode, motion vectors of several candidate blocks may be used as candidate MVPs, and by using one of the candidate MVPs, motion information on the current block may be derived. In the merge mode, by using the motion vector of a candidate block selected from the candidate blocks at the left of the current block and the candidate blocks at the top of the current block, motion information on the current block may be derived.

However, even if candidate blocks of the AMVP mode and candidate blocks of the merge mode are different from each other, an area searched to select candidate blocks (that is, a candidate MVPs) in the AMVP mode includes merge candidates. For example, in the case of FIG. 6 where the AMVP mode is applied, areas 610 and 620 searched to select candidate blocks A and B may include candidate blocks 710 and 720 which are selected for merge mode in the case of FIG. 7 where the merge mode is applied.

Additionally, as a method of deriving motion information on the current block, the AMVP mode and the merge mode may be sequentially applied. The transmitted information amount may be reduced by deriving information necessary for the mode to be used later from the first applied mode. For example, it is assumed that the AMVP mode is applied, and the merge mode is used if the AMVP mode is determined not to be used. Then, information used for AMVP mode (e.g., information on a candidate block such as a candidate MVP) is combined in order to derive information necessary for applying the merge mode. For example, information on a skip flag used in the AMP mode, information on a syntax representing a prediction mode, and information on AMVP candidates may be combined in order to reduce the amount of information used for representing the merge mode.

In more detail, a candidate of the merge mode may be considered during calculating of costs for selecting the best candidate from AMVP candidates.

Hereinafter, an aspect of an encoding device and an aspect of a decoding device will be separately described.

(1) Encoding Aspect

As mentioned above, if merge candidates are considered during calculating of costs for AMVP candidates, calculating of costs for the AMVP mode and the merge mode may be simplified at the side of an encoding device. Therefore, encoding complexity may be reduced.

In more detail, an encoding device may check costs when the AMVP mode is applied to the current bock. At this point, the encoding device may separately check costs for the skip mode and costs for the direct mode, respectively.

If costs for the skip mode are less than those for the direct mode, by using at least one of the two conditions 1) and 2) as below, a process for calculating costs for the merge mode may be passed. If costs for the skip mode are less than those for the direct mode, after comparing costs for a candidate for the skip mode and a candidate for the direct mode, it is determined that the skip mode is to be applied. Costs for the merge mode that transmits a residual signal while using a motion vector of a neighbor block in a way similar to the direct mode may be similar to those of the direct mode. If an AMVP candidate block is an already reviewed candidate block during comparing of costs for the skip mode and the direct mode, calculating of costs for the merge mode may not be performed on a corresponding candidate block.

1) Whether an AMVP candidate block or a candidate MVP, which is selected from the top area and the left area of the current block, is identical to a candidate block or a candidate motion vector of the merge mode. (hereinafter, for convenience of description, an AMVP candidate block or a candidate MVP is referred to as an AMVP candidate, and a candidate block or a candidate motion vector of the merge mode is referred to as a merge candidate.

2) Whether the best MVP determined through AMVP is identical to a merge candidate. When only using the condition 1), (a) When AMVP candidate selected from the left area of the current block (refer to 610 of FIG. 6) is identical to a merge candidate selected from the left area of the current block, cost calculation on the case that the current block is merged into the merge candidate which is selected from the left area of the current block is excluded during calculating of costs for the merge mode.

(b) When an AMVP candidate selected from the top area of the current block (refer to 620 of FIG. 6) is identical to a merge candidate selected from the top area of the current block, cost calculation on the case that the current block is merged into the merge candidate which is selected from the top area of the current block is excluded during calculating of costs for the merge mode.

(c) If necessary, a combination of (a) and (b) may be applied. For example, when (a) and (b) are simultaneously satisfied, cost calculation on a merge candidate selected from the left or top area of the current block may be excluded or an entire process for calculating costs for the merge mode may be excluded during calculating of costs for the merge mode.

When using the conditions 1) and 2), (a) When the best MVP determined through AMVP is in the left area of the current block (refer to 610 of FIG. 6) and is identical to a merge candidate selected from the left area of the current block, cost calculation on the case that current block is merged into the selected merge candidate is excluded during calculating of costs for the merge mode.

(b) When the best MVP determined through AMVP is in the top area of the current block (refer to the area B of FIG. 6) and is identical to a merge candidate selected from the top area of the current block, cost calculation on the case that the current block is merged into the selected merge candidate is excluded during calculating of costs for the merge mode.

(c) If necessary, a combination of (a) and (b) may be applied. For example, when (a) and (b) are simultaneously satisfied, cost calculation on a merge candidate selected from the left or top area of the current block may be excluded or an entire process for calculating costs for the merge mode may be excluded during calculating of costs for the merge mode.

Figure 9:
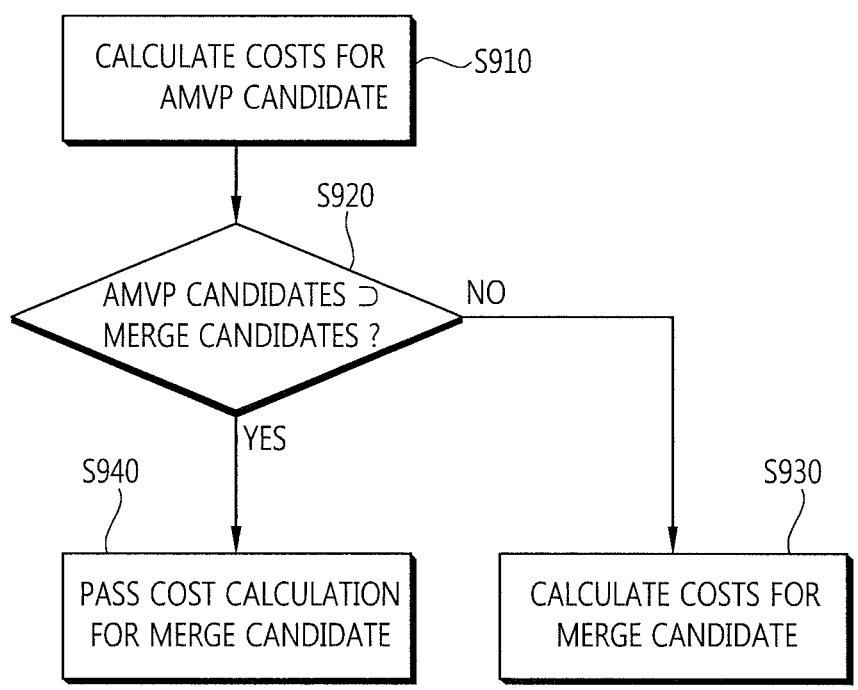
FIG. 9 is a flowchart illustrating a method of calculating costs for prediction candidates in an encoder according to an embodiment of the present invention.

FIG. 9 is a flowchart illustrating a method of calculating costs for prediction candidates in an encoding device according to an embodiment of the present invention.

Referring to FIG. 9, an encoding device (for example, a prediction module) calculates costs for AMVP candidates in operation S910.

The encoding device determines whether a merge candidate is included in the AMVP candidate in operation S920. At this point, whether the merge candidate is included in the AMVP candidate includes determining whether one of entire AMVP candidates is identical to the merge candidate and determining whether the best AMVP candidate is identical to the merge candidate. Detailed description for each case is identical to the above description.

When the merge candidate is included in the AMVP candidate, (that is, the merge candidate is identical to one of AMVP candidates), cost calculation on the case that the current block is merged into a corresponding merge candidate is excluded in operation S930. If the merge candidate is not included in the AMVP candidate, costs on the case that the merge candidate is merged into a corresponding merge candidate are calculated in operation S940.

(2) Decoding Device Aspect

When the skip mode is not applied (skip_flag==0) and an inter prediction is applied (pred_mode==MODE INTER), even if both a merge_flag (for example, merge_flag) and/or a flag indicating a merge direction/target (for example, merge_left_flag) are not transmitted, a decoding device may derive motion information on a current block. At this point, the following condition may be used.

Condition: Whether an AMVP candidate and a merge candidate selected for the left area and the top area of a current block (for example, the areas A and B of FIG. 6) are identical When the above condition is applied, (a) When an AMVP candidate selected from the left area of the current block (refer to the area A of FIG. 6) is identical to a merge candidate selected from the left area of the current block, if the merge mode is applied (merge_flag==1), the current block may be merged into the selected merge candidate. Accordingly, a flag indicating that the current block is merged into a merge candidate of which side (for example, merge_left_flag) may not be transmitted from an encoding device.

(b) When an AMVP candidate selected from the top area of the current block (refer to the area B of FIG. 6) is identical to a merge candidate selected from the top area of the current block, if the merge mode is applied (merge_flag==1), the current block may be merged into the selected merge candidate. Accordingly, a flag indicating with which merge candidate on which side of the current block the current block is to be merged (for example, merge_left_flag) may not be transmitted from encoding device.

(c) If necessary, a combination of (a) and (b) may be applied. For example, when an AMVP candidate selected from the left area of the current block and an AMVP candidate selected from the top area of the current block are identical to a merge candidate selected from the left area of the current block and a merge candidate selected from the top area of the current block, respectively, the merge mode may not be applied. Accordingly, a flag indicating whether the merge mode is to be applied (for example, merge_flag) and a flag indicating with which merge candidate on which side of the current block the current block is to be merged (for example, merge_left_flag) may not be transmitted from an encoding device.

Figure 10:
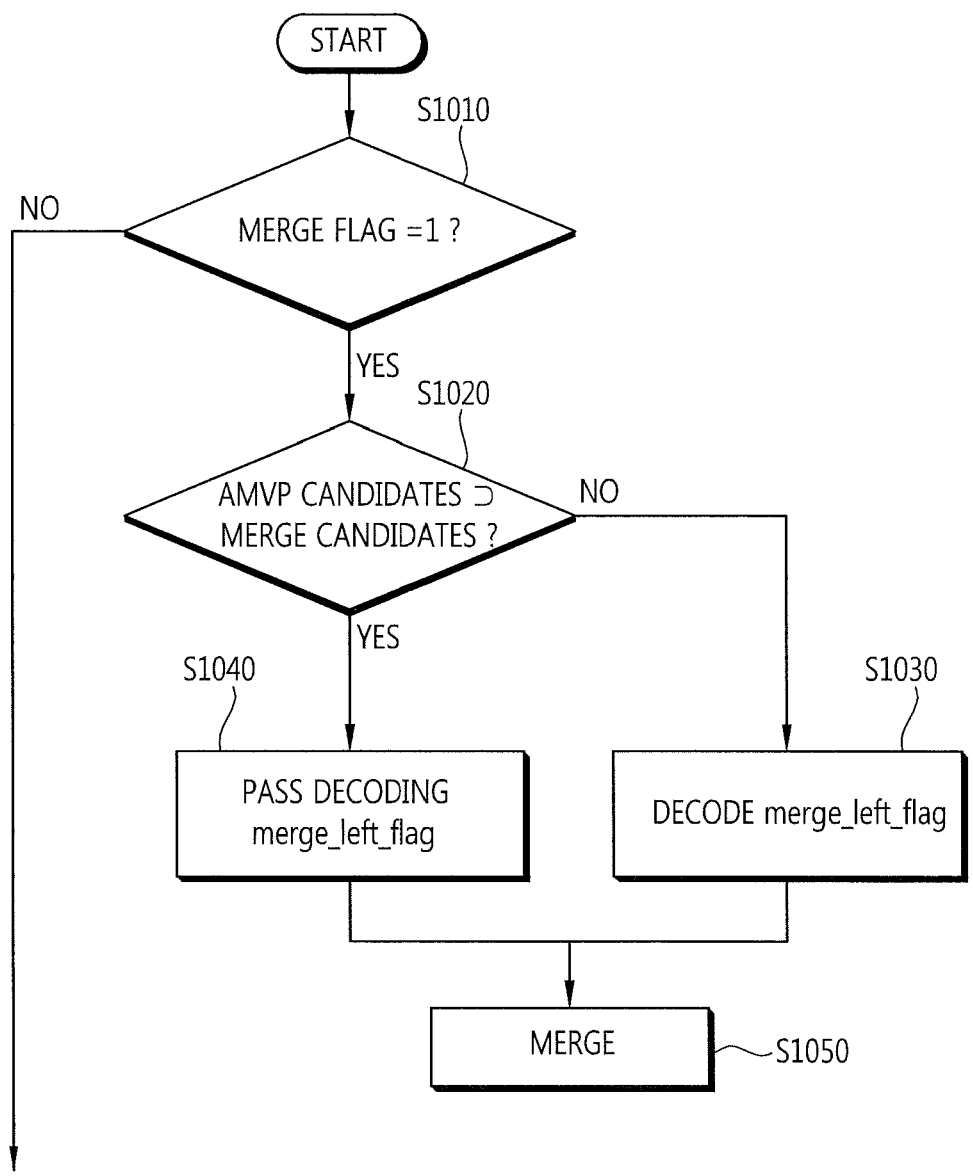
FIG. 10 is a flowchart illustrating a method of performing merging in a decoder according to an embodiment of the present invention.

FIG. 10 is a flowchart illustrating a method of performing the merge mode in a decoding device according to an embodiment of the present invention. Referring to FIG. 10, the decoding device may determine whether the merge mode is applied in operation S1010.

When the merge mode is applied, it is determined whether at least one of merge candidates is included in AMVP candidates. At this point, whether the merge candidate is included in the AMVP candidate includes determining whether one of entire AMVP candidates is identical to the merge candidate and determining whether the best AMVP candidate is identical to the merge candidate. Detailed description for each case is identical to the above description.

If the merge candidates are not identical to the AMVP candidates, a flag indicating with which merge candidate on which side of the current block the current block is merged is decoded in operation S1030, and the merge is performed according to the flag in operation S1050. If one of the merge candidates is identical to any AMVP candidate, a flag indicating with which merge candidate on which side of the current block the AMVP candidate is merged is not decoded in operation S1040, and the current block is merged into a merge candidate which is different with the AMVP candidate in operation S1050. Here, not decoding the flat indicating with which merge candidate on which side of the current block the current clock is merged includes not performing decoding with the reason that a corresponding flat is not transmitted from an encoding device.

Another method of integrating an AMVP using method (AMVP mode) and a merge mode can be proposed. In this method, a merge candidate may be considered during generating of an AMVP candidate. That is, when every AMVP candidates is different from a merge candidate, the merge candidate may be added as an AMVP candidate and an AMVP mode may be applied. At this point, by considering the similarity between the AMVP mode and the merge mode, an encoding device may signal to a decoding device to use only one of the AMVP mode and the merge mode. Here, "signal" means transmitting related information and/or instruction.

First, the encoding device compares an AMVP candidate list with a merge candidate list in order to check whether an AMVP candidate and a merge candidate are identical with respect to a neighboring area of the current block (for example, the left and/or top area of the current block 610 or 620 of FIG. 6).

When some or entire merge candidates are not in the AMVP list (that is, there is a merge candidate not included in the AMVP candidate) with respect to a neighboring area of the current block, the merge candidate instead of the AMVP candidate may be added to the AMVP candidate list. Accordingly, the AMVP candidates may be extended.

At this point, without signaling for the merge mode, signaling for applying the list of the extended AMVP candidates and the AMVP mode may be made. For example, when a residual signal is transmitted, signaling may be made in order to perform the direct mode using the extended AMVP candidates.

As mentioned above, besides the method of extending AMVP candidates by adding a merge candidate to an AMVP candidate list, by competing some or all of AMVP candidates with a merge candidate, some or all of the AMVP candidates may be replaced/modified with/into the merge candidate. In this case, an encoding device may signal to a decoding device in order to apply the AMVP mode on the basis of the changed AMVP candidate list.

Figure 11:
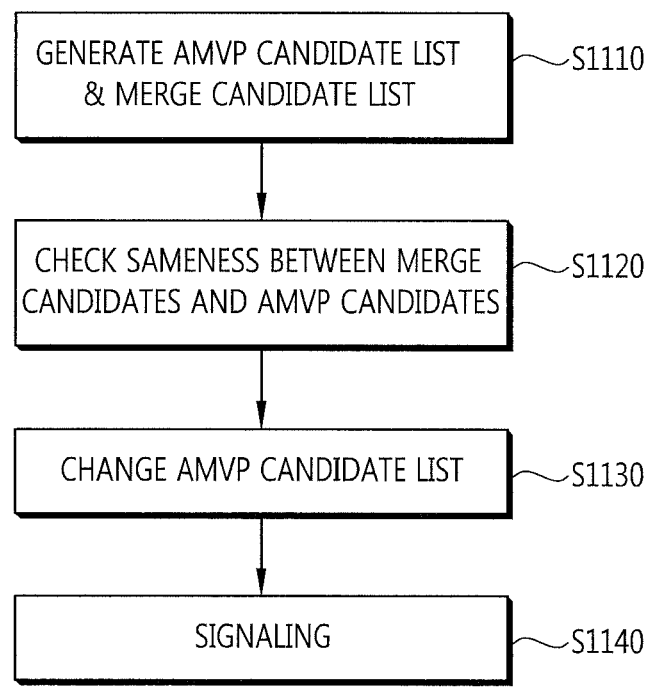
FIG. 11 is a flowchart illustrating an operation of changing an AMVP candidate in an encoder according to an embodiment of the present invention.

FIG. 11 is a flowchart illustrating an operation of changing an AMVP candidate according to an embodiment of the present invention.

Referring to FIG. 11, an encoding device (for example, a prediction module) creates an AMVP candidate list and a merge candidate list for a current block in operation S1110.

The encoding device determines whether an AMVP candidate and a merge candidate are identical on the basis of the AMVP candidate list and the merge candidate list in operation S1120. For example, the encoding device may confirm whether there is a merge candidates not included in the AMVP candidates.

The encoding device may change the AMVP candidate list by using a merge candidate not included in the AMVP candidate list in operation S1130. At this point, the encoding device may add a merge candidate not included in the AMVP candidate list to the AMVP candidate list, and may change part of the AMVP candidate list into a merge candidate(s).

The encoding device may signal the changed AMVP candidate list to the decoding device in operation S1140. At this point, the signaling of the encoding device may include signaling to transmit the changed AMVP candidate list or signaling to change the AMVP candidate list.

Figure 12:
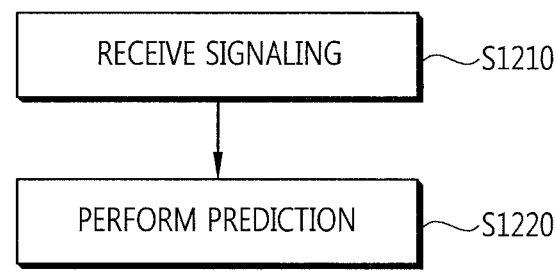
FIG. 12 is a view illustrating a method of performing prediction on the basis of an AMVP list changed in a decoder according to an embodiment of the present invention.

FIG. 12 is a view illustrating a method of performing prediction on the basis of a changed AMVP list in a decoding device according to an embodiment of the present invention. Referring to FIG. 12, the decoding device receives signaling from an encoding device in operation S1210.

The signaling from the decoding device includes an AMVP candidate list. Additionally, the signaling from the encoding device may be signaling which is for changing the AMVP candidate list.

When receiving the changed AMVP candidate list, the decoding device replaces the existing AMVP candidate list and when receiving signaling to change the AMVP candidate list, the decoding device changes the AMVP candidate list according to the signaling.

The decoding device selects the best MVP on the basis of the changed AMVP candidate list and performs prediction with the best MVP in operation S1220.

<Integration of AMVP Using Method and Merge Mode—Integration Mode and Signaling>

In the case of the merge mode, motion information on a current block is derived from neighbor blocks. The merge mode in which a residual signal is transmitted is similar to the above-mentioned direct mode. Accordingly, the application of an integrated merge mode (which transmits a residual signal) and direct mode may be considered.

For example, when the direct mode is applied by a coding block (i.e. a coding unit) unit, if the merge mode may be applied by the coding block unit and a partition unit of a split coding block, the merge mode may be integrated with the direct mode in the same unit as the direct mode.

Identically, if a unit of an applied direct mode and a processing unit of an applied merge mode are identical among processing units such as a coding block, a prediction block, a transform block, the direct mode and the merge mode may be integrated and applied with respect to a corresponding processing unit.

Here, although the integration of the merge mode in which a residual signal is delivered and the direct mode in which a residual signal is transmitted and an AMVP is used is described as an example, a similar mode, for example, a merge mode not transmitting a residual signal or a skip mode not transmitting a residual signal through an AMVP may be integrated using the same method.

Accordingly, the merge mode and the AMVP mode may be integrated and applied through a method described below. A specific method of the integration may include a method of generating/deriving a neighbor candidate block or candidate motion vector (hereinafter, referred to as a candidate), which may be used for deriving motion information on a current block. This will be described later.

In relation to the method of integrating the AMVP mode and the merge mode and applying the integrated mode, a necessary syntax structure will be described. The integration of the merge mode and the direct mode in the AMVP mode will be described below as an example.

When the merge is performed by a partition unit of a split coding block (a coding block may be a coding unit), signaling may be made to select and apply one of the merge mode and the direct mode, with respect to a corresponding partition.

Figure 13:
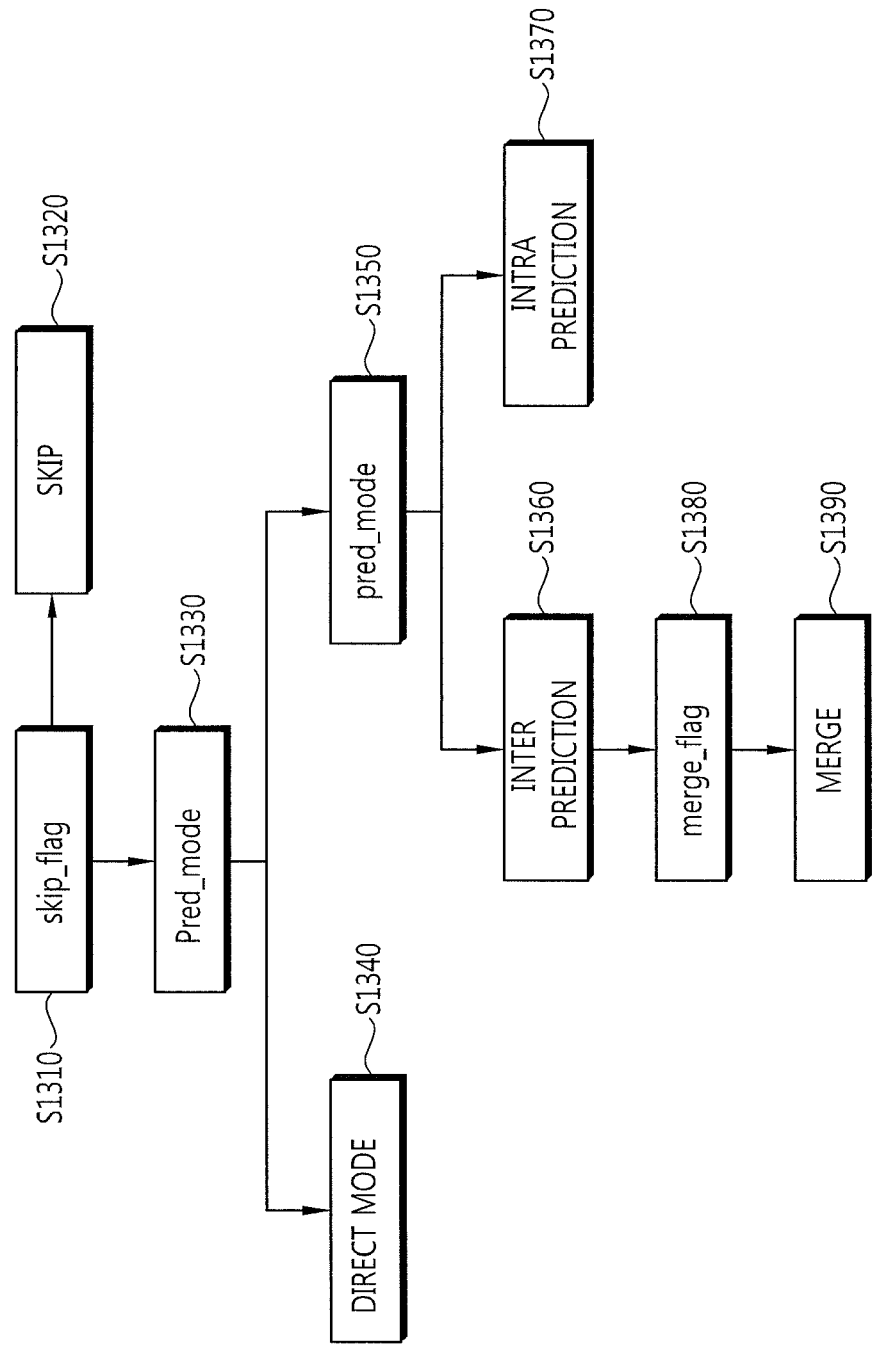
FIG. 13 is a flowchart illustrating a signaling method of selecting a direct mode and a merge mode according to an embodiment of the present invention.

FIG. 13 is a flowchart illustrating a signaling method of selecting a direct mode and a merge mode according to an embodiment of the present invention.

Referring to FIG. 13, after it is determined first whether the skip mode and the direct mode are applied, an inter prediction (that is, an inter mode) and an intra prediction (that is, an intra mode) are classified. In the case of the inter prediction mode, the merge mode may be applied according to merge_flag.

First, as mentioned above, it is determined whether the skip mode is to be applied according to skip_flag in operation S1310. When skip_flag indicates a skip mode, the skip mode is applied in operation S1320, and when skip_flag does not indicate a skip mode, it is determined again which prediction mode is to be applied in operation S1330. At this point, a syntax indicating a prediction mode (for example, Pred_mode) may be transmitted.

If the direct mode is indicated in operation S1330, the direct mode is applied in operation S1340, and if the direct mode is not indicated, a prediction mode may be indicated again with pred_mode in operation S1350. In operation S1350, pred_mode may indicate an intra mode and an inter mode.

When the intra mode is indicated in operation S1350, an intra prediction is applied to a current block in operation S1370, and when the inter mode is indicated in operation S1360, it may be determined whether the merge mode is to be applied to the current block in operation S1380. At this point, in order to indicate/determine whether the merge mode is to be applied, merge_flag may be used. When merge_flag indicates a merge mode, the merge mode is applied in order to derive motion information on a current block in operation S1390.

Whether to apply the merge mode may be determined by each partition. For example, when an entire coding block (coding block may be a coding unit) is one partition, whether to apply the merge mode on the entire coding block is determined and when the coding block is split into a plurality of partitions, whether to apply the merge mode by each partition unit is determined. The partition of a split coding block may be a coding block, a prediction block, or a transform block.

When the coding block is determined as one partition, the direct mode or the merge mode may be applied to a corresponding coding block. However, since information on the direct mode and the merge mode is transmitted through different signaling parts, i.e. different parameter sets in the existing method, despite the similarities between the two modes, information tends to be transmitted redundantly (that is, redundancy occurs).

However, if whether to apply the merge mode is determined by a partition unit, the merge mode and the AMVP mode (for example, a direct mode) may be applied to the same partition unit. Accordingly, information on the AMVP mode (for example, a direct mode) and the merge mode may be transmitted through the same signaling part, that is, the same parameter set.

For example, a method of integrating a merge mode (a) and a direct mode (b) may be considered. The merge mode (a) is applied when an entire coding block is one partition among merge modes dealt in the signaling part (below operation S1360) for the inter mode of FIG. 13. The direct mode (b) is dealt in the signaling part (operation S1340) for the direct mode of FIG. 13. At this point, candidates of the direct mode, that is AMVP candidates, and merge candidates are integrated, and by using a candidate selected from the integrated candidates, the AMVP mode (for example, the direct mode) or the merge mode may be applied.

Figure 14:
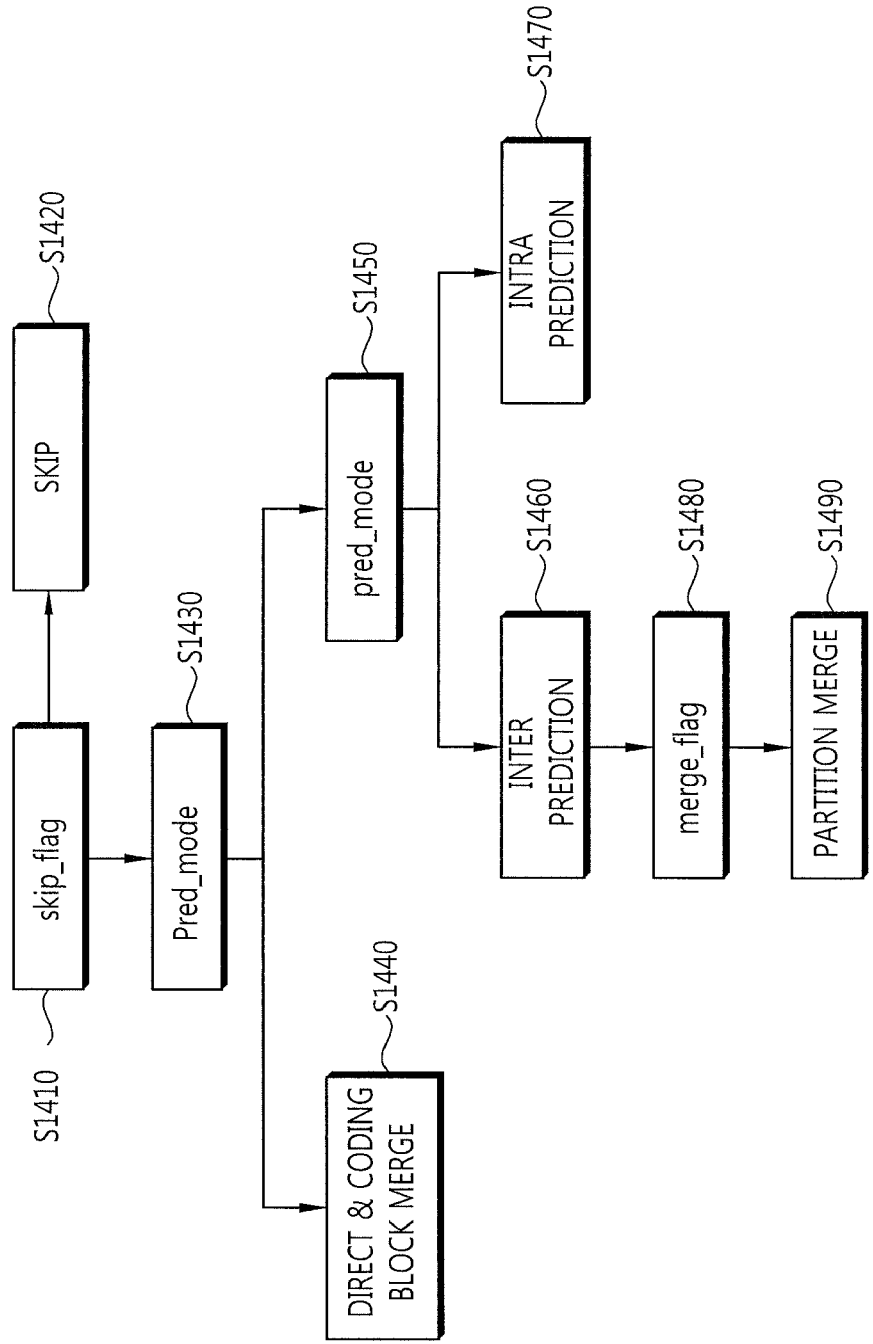
FIG. 14 is a view illustrating signaling through the integration of a direct mode and a merge mode according to an embodiment of the present invention.

FIG. 14 is a view illustrating signaling through the integration of a direct mode and a merge mode according to an embodiment of the present invention. Hereinafter, for convenience of description, the merge applied when an entire coding block is determined as one partition is referred to as a coding block merge and the merge applied by a partition unit when a coding block is split into a plurality of partitions is referred to as a partition merge.

Referring to FIG. 14, the case that the direct mode is applied by the coding block unit is described as an example. Accordingly, the integrated mode of the merge mode and the direct mode, which may be applied by a partition unit for using an entire coding block as one partition is described with reference to FIG. 14.

Referring to FIG. 14, it is determined whether the skip mode is to be applied according to skip_flag in operation S1410. When skip_flag indicates a skip mode, the skip mode is applied in operation S1420, and when skip_flag does not indicate a skip mode, it is determined again which prediction mode is to be applied in operation S1430. At this point, a syntax indicating a prediction mode (for example, Pred_mode) may be transmitted.

Unlike FIG. 13, a syntax (that is, a Pre-mode) may be signaled based on integration of the direct mode and the merge mode in operation S1440. In relation to the coding block unit, in consideration of the similarity between the direct mode and the merge mode, as mentioned above, signaling for applying the integrated mode of the coding block merge and the direct mode may be made in operation S1440.

When integrated mode of the merge mode and the direct mode is not applied by a coding block unit, the prediction mode may be indicated with pred_mode again in operation S1450. At this point, pred_mode may indicate whether prediction mode is an intra mode or an inter mode.

When the intra mode is indicated in operation S1450, an intra prediction is applied to a current block in operation S1470, and when the inter mode is indicated in operation S1460, it is determined whether the merge mode is to be applied to the current block in operation S1480. At this point, in order to indicate/determine whether the merge mode is applied, merge_flag may be used. When merge_flag indicates a merge mode, the merge mode is to be applied to the current block in operation S1490. Referring to FIG. 14, the coding block merge may be applied in operation S1440, and a partition merge may be applied in operation S1490.

Additionally, referring to FIG. 14, in order to indicate which one of the direct mode and the merge mode is to be applied, a flag may be used in operation S1440. A specific method of handling the case that one of two modes is indicated with a flag will be described together with a candidate of when a direct mode and a coding block merge are integrated.

Figure 15:
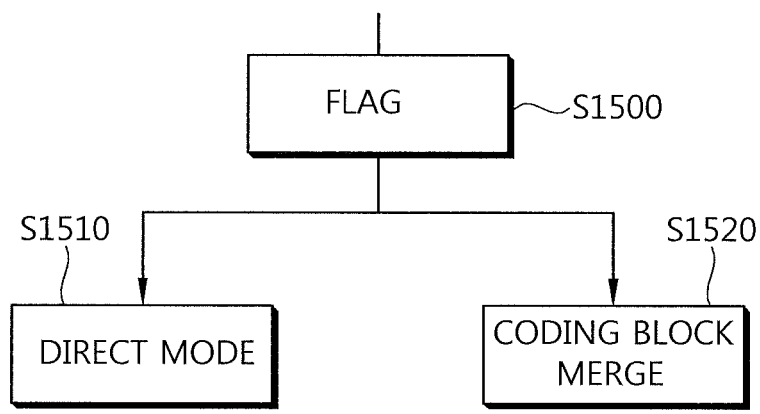
FIG. 15 is a view illustrating signaling whether a direct mode is to be applied or a coding block merge is to be applied through a flag according to an embodiment of the present invention.

FIG. 15 is a view illustrating embodiment of signaling whether a direct mode is to be applied or a coding block merge is to be applied through a flag according to the present invention.

Referring to FIG. 15, when the flag is used, it is determined whether the direct mode is to be applied or the coding block merge is to be applied according to the indication of the flag in operation S1500. For example, when the flag value is 0, the direct mode is applied in operation S1510, and when the flag value is 1, the coding block merge is applied in operation S1520.

Additionally, when signaling is made on whether to apply the direct mode or the coding block merge in operation S1440 of FIG. 14, the mode may not be explicitly indicated using a flag and whether to apply the direct mode or the coding block merge may be derived.

Figure 16:
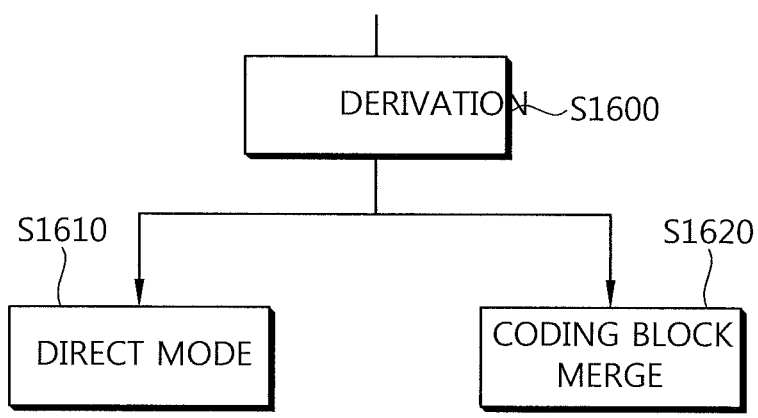
FIG. 16 is a view illustrating a method of deriving a determination on whether to apply a direct mode or a coding block merge according to an embodiment of the present invention.

FIG. 16 is a view illustrating a method of deriving a determination on whether to apply a direct mode or a coding block merge according to an embodiment of the present invention.

Referring to FIG. 16, through derivation instead of explicit indication or signaling, whether to apply the direct mode or the coding block merge may be determined in operation S1600. In order for a decoding device to derive a determination on which mode to be applied, information on a neighbor coding block, for example, a spatial neighbor block and/or a temporal neighbor block may be used. Additionally, statistical information on a picture that the current coding block belongs to or statistical information on a picture decoded earlier than a picture that the current coding block belongs to may be used.

According to the derived result, the direct mode is applied in operation S1610 or the coding block merge is applied in operation S1620.

Meanwhile, as described with reference to FIGS. 6 and 7, the direct mode and the merge mode have a difference in a method of obtaining a candidate. However, the two modes are integrated and motion information on the current block is determined in the integrated mode.

In the integrated mode, motion information on the current block may be determined from the following five candidate blocks. That is, an AMVP candidate block used in the direct mode and a merge mode candidate block may be integrated.

Candidate Blocks of Integrated Mode (1) A Block Selected from the Left Area of the Current Block For example, a block selected from 610 of FIG. 6, may be selected as a candidate block of an integrated mode.

As a method of selecting a candidate block from the left area of the current block, a method of selecting a candidate through an AMVP may be used. For example, while searching is made from the left area to the bottom or top direction, a first available block may be selected. A block in an intra mode may be regarded as an unavailable block and may be excluded from an AMVP candidate.

A specific block among blocks at the left area of the current block may be selected as a candidate block of an integrated mode. For example, a block which meets the corner block at the bottom left may be specified as a candidate of an integrated mode selected from the left area of the current block and then may be used.

(2) A Block Selected from the Top Area of the Current Block

For example, a block selected from 620 of FIG. 6, may be selected as a candidate block of an integrated mode.

As a method of selecting a candidate block from the top area of the current block, a method of selecting a candidate through an AMVP may be used. For example, while searching is made from the top area to the left or right direction, a first available block may be selected. A block in an intra mode may be regarded as an unavailable block and may be excluded from an AMVP candidate.

A specific block among blocks at the top area of the current block may be selected as a candidate block of an integrated mode. For example, a block which meets the corner block at the top right may be specified as a candidate of an integrated mode selected from the top area of the current block and then may be used.

(3) Block(s) Selected from the Corner Areas of the Current Block

For example, blocks selected from 630, 640, or 650 of FIG. 6, may be selected as a candidate block of an integrated mode.

As a method of selecting a candidate block from the left area of the current block, a method of selecting a candidate through an AMVP may be used. For example, while searching is made on blocks at the corner areas of the current block, a first available block may be selected. A block in an intra mode may be regarded as an unavailable block and may be excluded from an AMVP candidate.

Specific blocks at the corner areas of the current block may be selected as a candidate blocks of an integrated mode. For example, blocks at each corner of the current block (for example, 630, 640, or 650 of FIG. 6) may be specified as a candidate blocks of an integrated mode selected at the corner areas of the current block, and may be used.

(4) A Co-Located Block of the Current Block

Besides a spatial neighbor block, a temporal neighbor block for the current block, may be used as a candidate. For example, a co-located block with respect to the current block may be used as a candidate of an integrated mode. A method of selecting an AMVP candidate may be identically applied to a co-located block, or a co-located block of a specific reference picture may be used as a candidate.

(5) A Candidate Derived Through a Combination of the Above Candidates

For example, a median value of the candidates derived from (1), (2), and (3), may be used as a candidate of an integrated mode. Moreover, a motion vector selected from the same or different reference frame on list (L0 or L1) which is same with that of a co-located block may be derived as a candidate. Or, a motion vector selected from the same or different reference frame on list (L0 or L1) which is different with that of a co-located block may be derived as an additional candidate.

When prediction is performed using motion information on candidates for the integrated mode described as above (1) to (5), conditions on a prediction direction may be applied together and information thereon may be transmitted. The conditions may be (1) Using motion information on an L0 direction
(2) Using motion information on an L1 direction
(3) Using motion information on a combined list of L0 and L1 (for example, using a combined list of L0 and L1 or using average information of L0 and L1 motions)

In Addition, for example, in order to reflect all two features of the direct mode and the merge mode, motion information on the current block may be determined from a candidate block set whose number of candidate blocks is less than the number of candidate blocks used for the direct mode and greater than the number of candidate blocks used for the coding block merge. At this point, the current block may be a coding block, a prediction block, or a transform block.

Figure 17:
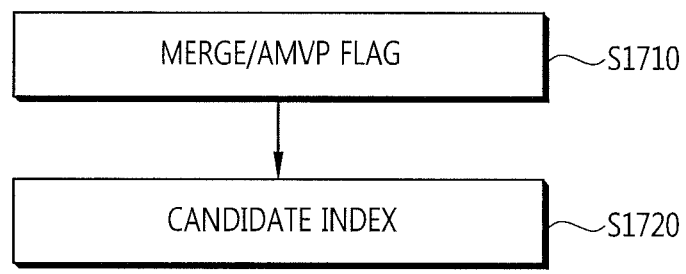
FIG. 17 is a flowchart illustrating signaling when an integrated mode is applied according to an embodiment of the present invention.

FIG. 17 is a flowchart illustrating signaling when an integrated mode is applied according to the present invention. Referring to FIG. 17, in order to apply the integrated mode, it is determined first through an AMVP/merge_flag (merge_flag) whether a merge mode is to be applied in operation S1710. The AMVP/merge_flag is a flag indicating whether to apply a merge mode or an AMVP mode. On the basis of the AMVP/merge_flag that an encoding device transmits, a decoding device may determine whether to apply a merge mode or an AMVP mode. For example, when the flag value is 0, the AMVP mode is applied, and when the flag value is 1, the merge mode is applied. At this point, instead of the AMVP/merge flag, a conventional merge flag may be transmitted. In this case, it may be possible that when the merge flag value is 1, the merge mode is applied, and when the merge flag value is 0, the AMVP mode is applied.

Then, an integrated mode candidate index is transmitted in operation S1710. A decoding device may confirm the best candidate for a mode (for example, a merge mode or an AMVP mode) which is indicated by the AMVP/merge flag or the merge flag, through the integrated mode candidate index transmitted from an encoding device.

Even when the merge mode is applied, the integrated mode candidate index may indicate which candidate among candidates of integrated mode including candidates at the corner in addition to merge candidates at the left and top areas of the current block and co-located block of the current block in a reference picture is used for merging. Accordingly, motion information on further various candidates may be utilized.

A decoding device may apply a mode that the AMVP/merge flag or the merge flag indicates on a candidate that the integrated mode candidate index indicates in order to derive motion information on the current block.

Moreover, when it is determined through the AMVP/merge flag or the merge flag (merge_flag) that the merge mode is to be applied, a merge candidate and a prediction direction may be determined. The merge candidate and the prediction direction may be transmitted as a candidate/direction index. The candidate/direction index may indicate whether prediction is performed in a uni-direction (for example, an L0 direction or an L1 direction) or a bi-direction, in addition to indicating which candidate is used for merging. At this point, a candidate that the candidate/direction index indicates may be one of candidates of the integrated mode.

Additionally, at least one of the merge candidate and the prediction direction may be derived according to a predetermined method or may be determined according to a predetermined rule. Information not derived or predetermined may be transmitted from an encoding device to a decoding device.

At this point, an index indicating which candidate is used for applying the merge mode and an index indicating a prediction direction may be separately transmitted. When the index indicates with which candidate a merge mode/a direct mode is applied, as mentioned above, the index may indicate which candidate among candidates including candidates at the corners of the current block and co-located block candidates as well as candidates at the left and top areas of a current area.

Additionally, when the index indicates a prediction direction, the index may indicate uni-direction or bi-direction and also may indicate one of L0 and L1 directions when indicating the uni-direction.

Since the index may indicates a candidate of the integrated mode and also a prediction direction, prediction may be performed on the current block by using detailed motion information.

Here, although the method of using the merge mode of the integrated mode is described, the method of the above-mentioned description may be identically applied to the AMVP mode of the integrated mode.

Hereinafter, a method of selecting the best candidate in an integrated mode will be described.

Figure 18:
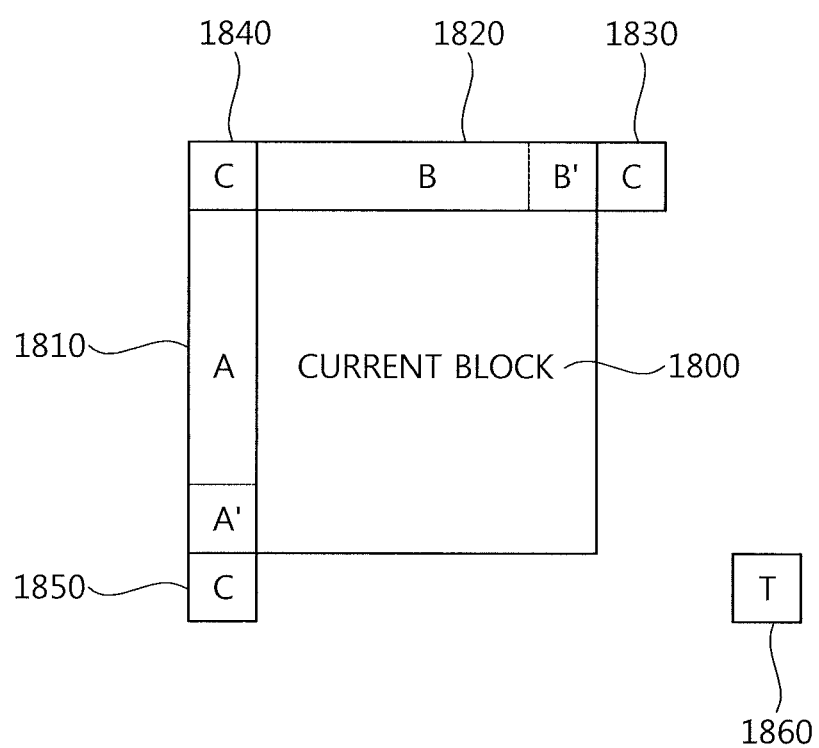
FIG. 18 is a view illustrating an area where candidate blocks of an integrated mode are selected according to an embodiment of the present invention.

FIG. 18 is a view illustrating an area where candidate blocks of an integrated mode are selected according to an embodiments of the present invention.

As mentioned above, candidate blocks of an integrated mode may be selected from (1) the left area A 1810 of the current block 1800, (2) the top area B 1820 of the current block 1800, (3) the corner areas C 1830, 1840, and 1850 of the current block 1800, (4) a combination of (1) to (3), and (5) a block T 1860 co-located at the position of the current block 1800.

When it is determined that a merge mode is to be applied through a merge flag, a candidate block to which the merge mode is to be applied may be selected from the integrated mode candidate blocks of (1) to (5). Additionally, when it is determined that an AMVP mode (that is, a skip mode/a direct mode) is to be applied through the merge flag, a candidate block for deriving motion information on the current block in the AMVP mode may be selected from the integrated mode candidate blocks of (1) to (5).

At this point, when the merge mode is applied using the integrated mode candidates, 1) Two candidates may be selected like a conventional merge mode and then the current block may be merged into one of the two candidate blocks through MVC. As the MVC method it may be used a method of calculating costs for merging a motion vector of each candidate block, and based on this, selecting one candidate block. At this point, the two candidate blocks, as the case of FIG. 7, may be the candidate block at the left top of the current block and the candidate block at the top left of the current block, respectively. At this point, in addition to the a spatial neighbor block for the current block a temporal neighbor block, for example, the co-located block T 1860, may be used as a candidate.

2) The two candidate blocks may be selected through (1) and (2) described above for the candidate blocks of the integrated mode. For example, the two candidate blocks may be selected through a method of searching each AMVP candidate from the left area 1810 and the top area 1820 of the current block. Additionally, specific blocks positioned at the left area 1810 and the right area 1820 of the current block may be the block A' at the left bottom and the block B' at the top right. The co-located block T 1860 for the current block may be also used as a candidate.

3) Additionally, unlike a conventional merge mode, all blocks spatially neighboring to the current block may be used as candidate blocks. For example, all the candidate blocks (1) to (3) of the above integrated mode may be used as candidate blocks. Moreover, a co-located block with respect to the current block may be also used as a candidate. At this point, with limiting the number of candidate blocks used, one candidate block may be selected from candidate blocks in a corresponding number. In this case, with putting an order on an availability determination, after the determination is made according to the order, a candidate list may be configured according to the determined available order. For example, as a result determined according to the order, the lowest index is assigned to the determined first available candidate. Also, as a candidate is determined later, a higher index may be assigned.

On the basis of the configured candidate list, a merge target candidate which is used for merging may be selected through a process of selecting the best candidate, as mentioned above.

For example, available candidate blocks may be searched from the candidate blocks of the integrated mode spatially positioned around the current block according to the described order (1) to (3) of the integrated mode candidate blocks, i.e., the order of the left area 1810 of the current block 1800→the top area 1820 of the current block 1800→the corner areas 1830, 1840, and 1850 of the current block 1800. At this point, in the case that specific blocks at the left area 1810 and the top area 1820 of the current block 1800 are used, a candidate list may be configured by determining the availability in the order of A'→B'→the corner blocks 1830, 1840, and 1850. Additionally, for the corner blocks also, the availability may be determined by a specific order. For example, by starting search from the corner block 1830 in order to search an adjacent corner block after the top area is searched, the availability may be determined in the order of the corner block 1830→the corner block 1840→the corner block 1850 or the corner block 1830→the corner block 1850→the corner block 1840.

If there is an unavailable candidate block according to the search result, as mentioned above, a new candidate is selected or generated by using the searched candidate blocks. Additionally, although the number of candidate blocks is determined in order to select the best candidate by configuring candidate list, even when the number of available candidate blocks is less than the number of candidate blocks constituting the candidate list, as mentioned above, a new candidate block may be selected or generated.

Moreover, when the AMVP mode is applied using the integrated mode candidate,

1) Two candidates may be selected from candidate blocks spatially positioned around the current block like a merge mode and then one of the two candidate blocks may be selected as the best candidate through MVC. As the MVC method, it may be used a method of calculating costs for using an MVP of each candidate block, and based on this, selecting the best candidate block. At this point, a temporal neighbor blocks as well as spatial neighbor blocks for the current block, for example, the co-located block T 1860, may be used as a candidate.

2) The two candidate blocks may be selected through (1) and (2) described above for the candidate blocks of the integrated mode. For example, the two candidate blocks may be selected through a method of searching each AMVP candidate from the left area 1810 and the top area 1820 of the current block. Additionally, specific blocks positioned at the left area 1810 and the right area 1820 of the current block may be the block A' at the left bottom and the block B' at the top right. The co-located block T 1860 for the current block may be also used as a candidate.

Unlike the conventional merge mode using two candidate blocks, in the case of the AMVP mode using more candidate blocks, a search order may be determined in order to two available candidate blocks. For example, one candidate block may be selected by searching the left area 1810 of the current block 1800 including the corner block 1850 and one candidate block may be selected by searching the top area 1820 of the current block 1800 including the corner block 1830. At this point, the corner block 1840 may be included in the left area of the current block 1800 or may be included in the top area of the current block 1800 in order for searching. Accordingly, one candidate block may be selected from the areas 1810, 1840, and 1850, and one candidate block may be selected from the areas 1820 and 1830. Also, one candidate block is selected from the areas 1810 and 1850 and one candidate block may be selected from the areas 1820, 1830, and 1840.

When specific blocks are designated from the left area 1810 and the top area 1820 of the current block 1800 and used, one candidate block may be selected from the block A' and the corner blocks 1840 and 1850, and one candidate may be selected from the block B' and the corner block 1830, or, one candidate block may be s elected from the block A' and the corner block 1850, and one candidate block may be selected from the block B' and the corner blocks 1830 and 1840.

Without dividing an area on the basis of a current block for searching, an entire area may be searched as one unit. For example, searching may be made from corner block 1830 toward the corner block 1850 through the corner block 1840. Additionally, searching may be alternately made from the corner blocks at the top and the right. For example, while searching is made in the order of the corner block 1830→the corner block 1850→the left area 1810 or the block A'→the top area 1820 or the block B'→the corner block 1840, available two blocks may be selected by order of first search.

3) All blocks spatially located around the current block may be used as candidate blocks. For example, all the candidate blocks described in (1) to (3) of the above integrated mode (that is, a candidate block selected from the top area of the current block, a candidate block selected from the left area, and a candidate block(s) selected from the corner area or positioned at the corner area) may be used as candidate blocks. Moreover, a co-located block with respect to the current block may be also used as a candidate.

At this point, with limiting the number of candidate blocks used, one candidate block may be selected from candidate blocks in a corresponding number. In this case, with putting an order on an availability determination, after the determination is made according to the order, a candidate list may be configured according to the determined available order. On the basis of the candidate list, the best candidate may be selected as mentioned above.

For example, available candidate blocks may be searched from the candidate blocks of the integrated mode spatially positioned around the current block according to the described order (1) to (3) of the integrated mode candidate blocks, i.e., the order of the left area 1810 of the current block 1800→the top area 1820 of the current block 1800→the corner areas 1830, 1840, and 1850 of the current block 1800. In the case that specific blocks at the left area 1810 and the top area 1820 of the current block 1800 are used, they may be selected by determining the availability in the order of A'→B'→the corner blocks 1830, 1840, and 1850. Additionally, for the corner blocks also, the availability may be determined by specific order. For example, by starting search from the corner block 1830 in order to search an adjacent corner block after the top area is searched, searching may be made in the order of the corner block 1830→the corner block 1840→the corner block 1850 or the corner block 1830→the corner block 1850→the corner block 1840.

If there is an unavailable candidate block according to the search result, as mentioned above, a new candidate is selected or generated by using the searched candidate blocks. Additionally, although the number of candidate blocks is determined in order to select the best candidate by configuring candidate list, even when the number of available candidate blocks is less than the number of candidate blocks constituting the candidate list, as mentioned above, a new candidate block may be selected or generated.

Figure 19:
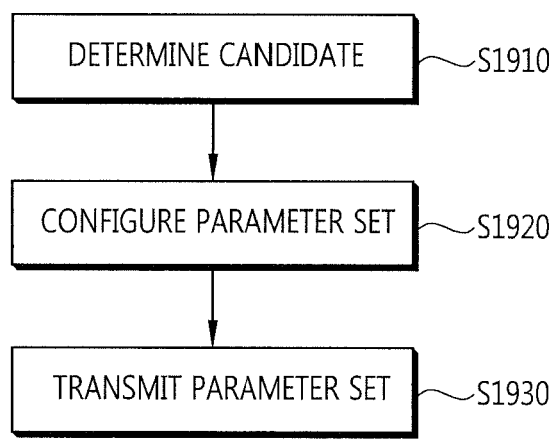
FIG. 19 is a flowchart illustrating a method of generating a prediction candidate by applying an integrated mode and transmitting corresponding information in an encoder according to an embodiment of the present invention.

FIG. 19 is a flowchart illustrating a method of generating a prediction candidate by applying an integrated mode and transmitting corresponding information in an encoding device according to an embodiment of the present invention.

Referring to FIG. 19, the encoding device determines a mode to be applied on a current block and determines candidates used for performing prediction through a corresponding mode in operation S1910.

A method of selecting candidates of an integrated mode is described above.

Then, the encoding device configures a parameter set in operation S1920. The parameter set may be configured according to a syntax structure on corresponding information, and may be configured to include information on an integrated mode used for the prediction of the current block and information relating to the candidates of the determined integrated mode.

The encoding device transmits the configured parameter set in operation S1930. Information on the parameter set may be encoded and transmitted to the decoding device through bitstream.

Figure 20:
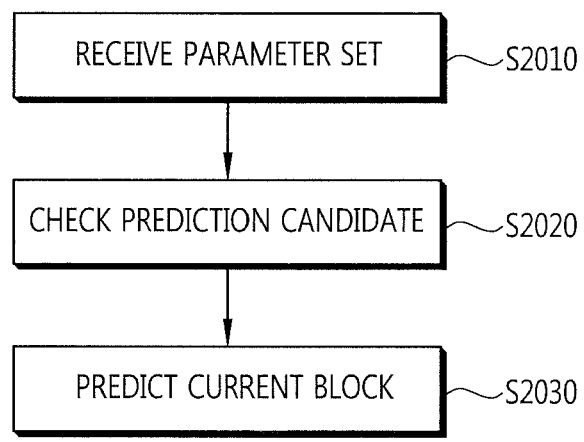
FIG. 20 is a flowchart illustrating a method of performing prediction by applying an integrated mode in a decoder according to an embodiment of the present invention.

FIG. 20 is a flowchart illustrating a method of performing prediction by applying an integrated mode in a decoding device according to an embodiment of the present invention.

Referring to FIG. 20, the decoding device receives the parameter set from the encoding device in operation S2010. The parameter set is encoded and transmitted through bitstream, and includes information on an integrated mode used for prediction and information relating to a candidate of the integrated mode.

The decoding device may obtain information relating to the prediction of the current block from the received parameter set in operation S2020. The decoding device may determine a prediction mode of the current block on the basis of the information transmitted from the decoding device through the parameter set. The prediction mode may be an integrated mode of the merge mode and the AMVP mode. Which one mode of the merge mode and the AMVP mode is to be applied may be determined through a flag in the parameter set. The decoding device may determine the best candidate for a prediction mode, which is to be applied on the basis of information on the candidate of the integrated mode obtained from the parameter set. A method of determining a candidate of an integrated mode is described above.

The decoding device applies a predetermined prediction mode, for example, a merge mode or an AMVP mode, on the current block, and performs prediction on the current block by using the determined motion information on the best candidate in operation S2030.

In the above exemplary system, although the methods are described based on the flowchart using a series of operations and blocks, the present invention is not limited to the order of the operations. Additionally, the above embodiments include various aspects of embodiments. Accordingly, the present invention includes all other replacements, modifications, and changes within the scope of the claims below.

In the description of the present invention until now, when one component is referred to as being "connected" or "accessed" to another component, it can be directly connected or accessed to the other component or intervening component may also be present. On the contrary, when one component is "directly connected to" or "direction accessed to" another component, it should be understood as there is no component between the two components.

The invention claimed is:

1. An inter prediction method performed by a decoding apparatus, the method comprising:
receiving a merge index and a merge flag for inter prediction of a current block;
deriving an inter prediction mode of the current block into a merge mode based on the merge flag;
constructing a merge candidate list for deriving motion information of the current block based on neighboring candidate blocks of the current block;
selecting a specific merge candidate from the merge candidate list based on the merge index;
deriving the motion information of the current block based on motion information of the selected merge candidate; and
performing prediction for the current block based on the derived motion information,
wherein based on the inter prediction being the merge mode, the neighboring candidate blocks include spatial neighboring blocks and a temporal neighboring block, the spatial neighboring blocks are a left neighboring block, an upper neighboring block, a bottom left corner neighboring block, an upper left corner neighboring block, an upper right corner neighboring block,
wherein the left neighboring block is a lowest block among left neighboring blocks adjacent to a left boundary of the current block, the lowest block is adjacent to an upper boundary of the bottom left corner neighboring block,
wherein the upper neighboring block is a rightmost block among upper neighboring blocks adjacent to an upper boundary of the current block, the rightmost block is adjacent to a left boundary of the upper right corner neighboring block, and wherein the temporal neighboring block is a co-located block which is located in a reference picture.

2. A method of encoding video information performed by an encoding apparatus, the method comprising:

determining an inter prediction mode of the current block, wherein the inter prediction mode is a merge mode;

constructing a merge candidate list for deriving motion information of the current block based on neighboring candidate blocks of the current block;

selecting a specific merge candidate from the merge candidate list;

generating the motion information of the current block based on motion information of the selected merge candidate;

generating a prediction sample of the current block based on the generated motion information;

generating a residual sample of the current block based on the prediction sample;

generating residual information for the residual sample and a merge index indicating the selected specific merge candidate from the merge candidate list; and encoding video information including a merge flag for the determined inter prediction mode, the merge index and the residual information, wherein based on the inter prediction mode being the merge mode, the neighboring candidate blocks include a left neighboring block, an upper neighboring block, a bottom left corner neighboring block, an upper left corner neighboring block, an upper right corner neighboring block, and a temporal neighboring block, wherein the left neighboring block is a lowest block among left neighboring blocks adjacent to a left boundary of the current block, the lowest block is adjacent to an upper boundary of the bottom left corner neighboring block, wherein the upper neighboring block is a rightmost block among upper neighboring blocks adjacent to an upper boundary of the current block, the rightmost block is adjacent to a left boundary of the upper right corner neighboring block, and wherein the temporal neighboring block is a co-located block which is located in a reference picture.

3. A non-transitory computer-readable storage medium storing video information including a merge flag, a merge index and residual information encoded by the method of encoding video information of claim 2.

* * * * *